United States Patent
Watanabe et al.

(10) Patent No.: US 9,898,752 B2
(45) Date of Patent: Feb. 20, 2018

(54) POINT SYSTEM, METHOD FOR CONTROLLING POINT SYSTEM, POINT MANAGEMENT DEVICE, PROGRAM, AND INFORMATION STORAGE MEDIUM

(71) Applicant: Rakuten, Inc., Tokyo (JP)

(72) Inventors: Yasuharu Watanabe, Tokyo (JP); Manabu Miyamoto, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 551 days.

(21) Appl. No.: 14/401,118

(22) PCT Filed: Apr. 12, 2013

(86) PCT No.: PCT/JP2013/061098
§ 371 (c)(1),
(2) Date: Nov. 14, 2014

(87) PCT Pub. No.: WO2013/172136
PCT Pub. Date: Nov. 21, 2013

(65) Prior Publication Data
US 2015/0134437 A1    May 14, 2015

(30) Foreign Application Priority Data
May 16, 2012   (JP) ................................. 2012-112911

(51) Int. Cl.
*G06Q 30/00* (2012.01)
*G06Q 30/02* (2012.01)
(Continued)

(52) U.S. Cl.
CPC ..... *G06Q 30/0225* (2013.01); *G06Q 20/0655* (2013.01); *G06Q 20/12* (2013.01);
(Continued)

(58) Field of Classification Search
None
See application file for complete search history.

(56) References Cited

U.S. PATENT DOCUMENTS 5,974,396 A * 10/1999 Anderson .............. G06Q 30/02
705/14.25
8,660,893 B2 * 2/2014 Fordyce, III ........... G06Q 20/12
705/14.3
(Continued)

FOREIGN PATENT DOCUMENTS

JP    2002-216000 A    8/2002
JP    2002-319072 A    10/2002
(Continued)

OTHER PUBLICATIONS

International Search Report for PCT/JP2013/061098 dated May 14, 2013.

*Primary Examiner* — Matthew T Sittner
(74) *Attorney, Agent, or Firm* — Hubbs, Enatsky & Inoue PLLC

(57) ABSTRACT

A point storage unit stores points, which are imparted to the user in an electronic commerce, in association with user identification information. A link request receiving unit receives a link request for linking user identification information and membership card identification information for identifying a membership card for receiving points imparted at an actual shop. In a case where the link request is received, a link information storage unit stores link information indicating a link between the user identification information and the membership card identification information. In a case where a point use request with a designation of the membership card identification information is received, a use permission unit permits use of the points stored in associa- (Continued)

tion with the user identification information linked to the membership card identification information.

20 Claims, 32 Drawing Sheets

(51) Int. Cl.
  *G06Q 20/40*    (2012.01)
  *G06Q 20/06*    (2012.01)
  *G06Q 20/12*    (2012.01)
  *G06Q 20/20*    (2012.01)
  *G06Q 20/34*    (2012.01)
  *G06Q 20/36*    (2012.01)

(52) U.S. Cl.
  CPC ......... *G06Q 20/204* (2013.01); *G06Q 20/347* (2013.01); *G06Q 20/354* (2013.01); *G06Q 20/355* (2013.01); *G06Q 20/363* (2013.01); *G06Q 20/40* (2013.01); *G06Q 20/4012* (2013.01); *G06Q 30/02* (2013.01); *G06Q 30/0226* (2013.01)

(56) References Cited

U.S. PATENT DOCUMENTS

| | | | | |
|---|---|---|---|---|
| 2003/0171992 A1* | 9/2003 | Blagg | ............ | G06Q 20/385 705/14.17 |
| 2003/0182191 A1* | 9/2003 | Oliver | ............ | G06Q 30/02 705/14.27 |
| 2003/0225618 A1* | 12/2003 | Hessburg | ............ | G06Q 10/02 705/14.27 |
| 2004/0054591 A1* | 3/2004 | Spaeth | ............ | G06Q 30/02 705/14.27 |
| 2005/0021400 A1* | 1/2005 | Postrel | ............ | G06Q 20/105 705/14.24 |
| 2007/0057036 A1* | 3/2007 | Santa Cruz | ............ | G06Q 20/10 235/380 |
| 2008/0021772 A1* | 1/2008 | Aloni | ............ | G06Q 20/10 705/14.27 |
| 2008/0077486 A1* | 3/2008 | Davis | ............ | G06Q 30/02 705/14.27 |
| 2008/0139889 A1* | 6/2008 | Bagan | ............ | A61B 5/0002 600/300 |
| 2008/0210753 A1* | 9/2008 | Plozay | ............ | G06O 30/02 235/380 |
| 2009/0048916 A1* | 2/2009 | Nuzum | ............ | G06Q 20/06 705/14.14 |
| 2009/0076870 A1* | 3/2009 | Hammond | ............ | G06Q 10/087 235/385 |
| 2009/0192890 A1* | 7/2009 | Steinkamp | ............ | G06Q 30/02 705/14.17 |
| 2009/0307077 A1 | 12/2009 | Masuda | | |
| 2010/0010889 A1* | 1/2010 | Antonucci | ............ | G06Q 20/20 705/14.28 |
| 2010/0106570 A1* | 4/2010 | Radu | ............ | G06Q 20/20 705/14.3 |
| 2010/0280896 A1* | 11/2010 | Postrel | ............ | G06Q 30/02 705/14.29 |
| 2011/0196732 A1* | 8/2011 | Schueller | ............ | G06Q 20/20 705/14.33 |
| 2012/0010937 A1* | 1/2012 | Hanson | ............ | G06Q 30/02 705/14.27 |
| 2012/0215617 A1* | 8/2012 | Shah | ............ | G06Q 30/02 705/14.35 |
| 2012/0271705 A1* | 10/2012 | Postrel | ............ | G06Q 30/02 705/14.33 |
| 2012/0290368 A1* | 11/2012 | Im | ............ | G06Q 30/0229 705/14.3 |
| 2012/0296720 A1* | 11/2012 | Pirillo | ............ | G06Q 30/0239 705/14.17 |
| 2013/0013386 A1* | 1/2013 | Blomeyer | ............ | G06Q 30/0233 705/14.27 |
| 2013/0024267 A1* | 1/2013 | Libenson | ............ | G06Q 30/02 705/14.38 |
| 2013/0036373 A1* | 2/2013 | Alderfer | ............ | G06Q 10/103 715/757 |
| 2013/0057670 A1* | 3/2013 | Fukuda | ............ | G06Q 30/0643 348/77 |
| 2013/0166388 A1* | 6/2013 | Rodriguez | ............ | G06Q 30/0201 705/14.64 |
| 2013/0238408 A1* | 9/2013 | Cooke | ............ | G06Q 30/0207 705/14.3 |
| 2013/0282464 A1* | 10/2013 | Bradley | ............ | G06Q 20/227 705/14.27 |
| 2015/0134437 A1* | 5/2015 | Watanabe | ............ | G06Q 30/02 705/14.26 |
| 2015/0310477 A1* | 10/2015 | Mankoff | ............ | G06Q 30/0226 705/14.27 |

FOREIGN PATENT DOCUMENTS

| | | |
|---|---|---|
| JP | 2003-076910 A | 3/2003 |
| JP | 2003-099656 A | 4/2003 |
| JP | 2009-123092 A | 6/2009 |

* cited by examiner

| ORDER | | | |
|---|---|---|---|
| PRODUCT NAME | UNIT PRICE | QUANTITY | SUB-TOTAL |
| ————————— | 2000 | 1 | 2000 |
| ————————— | 1000 | 1 | 1000 |
| | | SHIPPING FEE | 0 |
| | | TOTAL | 3000 |

EARNED POINTS : 300

32
☐ USE POINTS  (POINT BALANCE : 500)

SENT TO : ———————————————————
PAYMENT METHOD : ——————————————

[ ORDER ] ~34

| REGISTRATION | |
|---|---|
| MEMBERSHIP CARD ID | ~72 |
| SECURITY CODE | ~74 |

REGISTER  CANCEL
  76       78

LIST

[NEW REGISTRATION] ~62    64

| MEMBERSHIP CARD ID | SHOP NAME | TYPE | VALIDITY | |
|---|---|---|---|---|
| 00001 | A | CARD | O | INVALIDATE |
| 00101 | B | CARD | O | INVALIDATE |

| USER ID | PASSWORD | USER NAME | ADDRESS | MAIL ADDRESS | POINT BALANCE |
|---|---|---|---|---|---|
| U0001 | --- | --- | --- | --- | 100 |
| U0002 | --- | --- | --- | --- | 50 |
| ... | ... | ... | ... | ... | ... |

FIG.11

| ID | TIME AND DATE | USER ID | EARNED POINTS | | USED POINTS |
|---|---|---|---|---|---|
| | | | BASIC | BONUS | |
| 00001 | --- | U0001 | 70 | 0 | 0 |
| 00002 | --- | U0001 | 30 | 0 | 0 |
| 00003 | --- | U0020 | 200 | 100 | 10 |
| ... | ... | ... | ... | ... | ... |

FIG.12

| ACTUAL SHOP ID | SHOP NAME | POSTCODE | ADDRESS | TELEPHONE NUMBER |
|---|---|---|---|---|
| S0001 | A | --- | --- | --- |
| S0002 | B | --- | --- | --- |
| ... | ... | ... | ... | ... |

FIG.13

| MEMBERSHIP CARD ID | CARD ID | SECURITY CODE | MAGNETIC CODE | ACTUAL SHOP ID | TYPE | VALIDITY FLAG | LINK FLAG | POINT BALANCE |
|---|---|---|---|---|---|---|---|---|
| 00001 | 123456789 | 999 | --- | S0001 | 0 | 1 | 1 | 200 |
| 00002 | 234567890 | 850 | --- | S0001 | 0 | 0 | 0 | 100 |
| ... | ... | ... | ... | ... | ... | ... | ... | ... |
| 00101 | 345678901 | 100 | --- | S0002 | 0 | 1 | 1 | 300 |
| ... | ... | ... | ... | ... | ... | ... | ... | ... |
| 02000 | | | | S0100 | 1 | 0 | 0 | 500 |
| ... | ... | ... | ... | ... | ... | ... | ... | ... |

FIG.14

| ID | TIME AND DATE | MEMBERSHIP CARD ID | ACTUAL SHOP ID | EARNED POINTS | | USED POINTS |
|---|---|---|---|---|---|---|
| | | | | BASIC | BONUS | |
| 00001 | --- | 00001 | S0001 | 200 | 0 | 0 |
| 00002 | --- | 00101 | S0002 | 300 | 0 | 0 |
| 00003 | --- | 01000 | S0100 | 100 | 50 | 200 |
| ... | ... | ... | ... | ... | ... | ... |

FIG.15

| USER ID | MEMBERSHIP CARD ID |
|---|---|
| U0001 | 00001 |
| U0001 | 00101 |
| ... | ... |

FIG.25

| MEMBERSHIP CARD ID | VALIDITY FLAG | LINK FLAG | POINT BALANCE |
|---|---|---|---|
| 00001 | 0 → 1 | 0 → 1 | 200 → 0 |
| 00101 | 0 → 1 | 0 → 1 | 300 → 0 |

FIG.26

| USER ID | POINT BALANCE |
|---|---|
| U0001 | 100 → 600 |

| LIST | | | | |
|---|---|---|---|---|
| THE NUMBER OF MEMBERSHIP CARDS /68 HAS REACHED UPPER LIMIT | | | 64 | |
| MEMBERSHIP CARD ID | SHOP NAME | TYPE | VALIDITY | |
| 00001 | A | CARD | O | INVALIDATE |
| 00002 | B | CARD | O | INVALIDATE |
| 00003 | C | MOBILE | O | INVALIDATE |

| CAMPAIGN | | | |
|---|---|---|---|
| SHOP | CONTENT | PERIOD | |
| A | ----- | ----- | PARTICIPATE ←―114 |
| B | ----- | ----- | PARTICIPATED |

| CAMPAIGN ID | ACTUAL SHOP ID | CONTENT | PERIOD |
|---|---|---|---|
| C0001 | S0001 | ----- | ----- |
| C0002 | S0002 | ----- | ----- |
| ... | ... | ... | ... |

FIG.37

| USER ID | CAMPAIGN ID |
|---|---|
| U0001 | C0002 |
| ... | ... |

| USER ID | PASSWORD | USER NAME | ADDRESS | MAIL ADDRESS |
|---|---|---|---|---|
| U0001 | --- | --- | --- | --- |
| U0002 | --- | --- | --- | --- |
| ... | ... | ... | ... | ... |

| ACTUAL SHOP ID | SHOP NAME | POSTCODE | ADDRESS | TELEPHONE NUMBER |
|---|---|---|---|---|
| S0001 | A | --- | --- | --- |
| S0002 | B | --- | --- | --- |
| ... | ... | ... | ... | ... |

FIG.44

| MEMBERSHIP CARD ID | CARD ID | SECURITY CODE | MAGNETIC CODE | ACTUAL SHOP ID | TYPE | VALIDITY FLAG | LINK FLAG | POINT BALANCE |
|---|---|---|---|---|---|---|---|---|
| 00001 | 123456789 | 999 | — — | S0001 | 0 | 1 | 1 | 200 |
| 00002 | 234567890 | 850 | — — | S0001 | 0 | 0 | 0 | 100 |
| ... | ... | ... | ... | ... | ... | ... | ... | ... |
| 00101 | 345678901 | 100 | — — | S0002 | 0 | 1 | 1 | 300 |
| ... | | | | ... | ... | ... | ... | ... |
| 02000 | | | | S0100 | 1 | 0 | 0 | 500 |
| ... | ... | | | ... | ... | ... | ... | ... |

FIG.45

| ID | TIME AND DATA | MEMBERSHIP CARD ID | ACTUAL SHOP ID | EARNED POINTS | | USED POINTS |
|---|---|---|---|---|---|---|
| | | | | BASIC | BONUS | |
| 00001 | --- | 00001 | S0001 | 200 | 0 | 0 |
| 00002 | --- | 00101 | S0002 | 300 | 0 | 0 |
| 00003 | --- | 01000 | S0100 | 100 | 50 | 200 |
| ... | ... | ... | ... | ... | ... | ... |

FIG.46

| USER ID | MEMBERSHIP ID |
|---|---|
| U0001 | 00001 |
| U0001 | 00101 |
| ... | ... |

POINT SYSTEM, METHOD FOR CONTROLLING POINT SYSTEM, POINT MANAGEMENT DEVICE, PROGRAM, AND INFORMATION STORAGE MEDIUM

CROSS REFERENCE TO RELATED APPLICATIONS

This application is a National Stage of International Application No. PCT/JP2013/061098 filed Apr. 12, 2013, claiming priority based on Japanese Patent Application No. 2012-112911 filed on May 16, 2012. The contents of each of the above documents are incorporated herein by reference in their entirety.

TECHNICAL FIELD

The present invention relates to a point system, a method for controlling a point system, a point management device, a program, and an information storage medium.

BACKGROUND ART

A point service is implemented in which a point card is issued to a user at an actual shop, and points are imparted to a user who presents the point card in buying or using a product or a service. A point service is provided in an electronic commerce via the Internet as well in which points are imparted in buying or using a product or a service.

As the above described point service, a point service is implemented in which, for example, a temporary point card is issued at an actual shop, and after completion of membership registration (registration) on a website, points can be imparted to the point card in accordance with an electronic commerce or the points imparted in the electronic commerce can be used at the actual shop.

In connection with the above described point service, various proposals have been made. For example, Patent Literature 1 discloses a system for enabling exchange of points between users using points.

CITATION LIST

Patent Literature

Patent Literature 1: JP2009-123092A

SUMMARY OF INVENTION

Technical Problem

In a point service that issues the above described temporary point card, it is possible to use points imparted in an electronic commerce transacted after completion of membership registration on a web site, using the point card after completion of membership registration. However, the above described point service does not consider at all a possibility of using points imparted in an electronic commerce transacted before completion of membership registration on the web site, using the point card after completion of membership registration. Therefore, it is not possible to use the points imparted in the electronic commerce transacted before completion of membership registration on the web site, using the point card after completion of membership registration.

The present invention has been conceived in view of the above, and aims to provide a point system, a method for controlling a point system, a point management device, a program, and an information storage medium that permits use of points imparted in an electronic commerce transacted before completion of registration of a membership card such as a point card or the like, using the membership card after completion of the registration.

Solution to Problem

In order to achieve the above described object, a point system according to the present invention is a point system for providing a point service to a user, including: point storage means for storing points in association with user identification information for identifying the user, the points being imparted to the user in an electronic commerce; link request receiving means for receiving a link request for linking the user identification information and membership card identification information for identifying a membership card for imparting and/or using points at an actual shop; link information registration means for registering link information in link information storage means in a case where the link request is received, the link information indicating a link between the user identification information and the membership card identification information; use request receiving means for receiving a point use request with a designation of the membership card identification information from a terminal device of the actual shop; and use permission means for permitting using, at the actual shop, the points stored in association with the user identification information linked to the membership card identification information, in a case where the point use request with a designation of the membership card identification information is received.

A method for controlling a point system according to the present invention is method for controlling a point system for providing a point service to a user, the method comprising: a step of accessing point storage means for storing points in association with user identification information for identifying the user, the points being imparted to the user in an electronic commerce; a link request receiving step of receiving a link request for linking the user identification information and membership card identification information for identifying a membership card for imparting and/or using points at an actual shop; a link information registration step of registering link information in link information storage means in a case where the link request is received, the link information indicating a link between the user identification information and the membership card identification information; a use request receiving step of receiving a point use request with a designation of the membership card identification information from a terminal device of the actual shop; and a use permission step of permitting using, at the actual shop, the points stored in association with the user identification information linked to the membership card identification information, in a case where the point use request with a designation of the membership card identification information is received.

A point management device according to the present invention is a point management device for providing a point service to a user, including means for accessing point storage means for storing points in association with user identification information for identifying the user, the points being imparted to the user in an electronic commerce; link request receiving means for receiving a link request for linking the user identification information and membership card identification information for identifying a membership card for imparting and/or using points at an actual shop; link information registration means for registering link information in link information storage means in a case where the link request is received, the link information indicating a link between the user identification information and the membership card identification information; use request receiving means for receiving a point use request with a designation of the membership card identification information from a terminal device of the actual shop; and use permission means for permitting using, at the actual shop, the points stored in association with user identification information linked to the membership card identification information, in a case where the point use request with a designation of the membership card identification information is received.

A program according to the present invention is a program for causing a computer to function as a point management device for providing a point service to a user, the program for causing the computer to function as means for accessing point storage means for storing points in association with user identification information for identifying the user, the points being imparted to the user in an electronic commerce; link request receiving means for receiving a link request for linking the user identification information and membership card identification information for identifying a membership card for imparting and/or using points at an actual shop; link information registration means for registering link information in link information storage means in a case where the link request is received, the link information indicating a link between the user identification information and the membership card identification information; use request receiving means for receiving a point use request with a designation of the membership card identification information from a terminal device of the actual shop; and use permission means for permitting using, at the actual shop, the points stored in association with the user identification information linked to the membership card identification information, in a case where the point use request with a designation of the membership card identification information is received.

An information storage medium according to the present invention is a computer readable information storage medium storing a program for causing a computer to function as a point management device for providing a point service to a user, the program for causing the computer to function as means for accessing point storage means for storing points in association with user identification information for identifying the user, the points being imparted to the user in an electronic commerce; link request receiving means for receiving a link request for linking the user identification information and membership card identification information for identifying a membership card for imparting and/or using points at an actual shop; link information registration means for registering link information in link information storage means in a case where the link request is received, the link information indicating a link between the user identification information and the membership card identification information; use request receiving means for receiving a point use request with a designation of the membership card identification information from a terminal device of the actual shop; and use permission means for permitting using, at the actual shop, the points stored in association with user identification information linked to the membership card identification information, in a case where the point use request with a designation of the membership card identification information is received.

In one embodiment of the present invention, the point system may further include means for storing points in association with the membership card identification information, the points being imparted to the membership card identification information, the use request receiving means may include means for receiving a point use request with a designation of the user identification information from a server device that provides the electronic commerce; and the use permission means may include means for permitting using, in the electronic commerce, the points stored in association with membership card identification information linked to the user identification information, in a case where the point use request with a designation of the user identification information is received.

In one embodiment of the present invention, the point system may further include means for storing points in association with a first membership card identification information, the points being imparted to the first membership card identification information; and means for storing points in association with a second membership card identification information, the points being imparted to the second membership card identification information, and in a case where the first membership card identification information and the second membership card identification information are linked to the user identification information and a point use request with a designation of the first membership card identification information is then received, the point use permission means may permit using the points stored in association with the user identification information linked to the first membership card identification information and the points stored in association with the second membership card identification information linked to the user identification information.

In one embodiment of the present invention, the point system may further include means for integrating points imparted to the membership card identification information into the points stored in association with the user identification information linked to the membership card identification information.

In one embodiment of the present invention, the point storage means may include means for storing the points, which are imparted to the membership card identification information, in association with the membership card identification information, and the point system may include means for integrating the points stored in association with the membership card identification information into the points stored in association with the user identification information, in a case where registration of the link information indicating the link between the user identification information and the membership card identification information is executed.

In one embodiment of the present invention, it may be possible to have a plurality of membership card identification information items linked to single user identification information, and the point system may further include means for restricting a number of membership card identification information items that are allowed to be linked to the single user identification information to a number equal to or less than a predetermined upper limit number.

In one embodiment of the present invention, the point system may further include means for receiving a use restriction request with a designation of the membership card identification information; and means for restricting use of the membership card identified by the membership card identification information in a case where the use restriction request with a designation of the membership card identification information is received.

In one embodiment of the present invention, the point system may further include first determination means for determining, in a case where first membership card identification information and second membership card identification information are linked to single user identification information, whether or not a difference in location between a first shop and a second shop is used is large based on a predetermined determination criterion, the first shop being a shop where a first membership card identified by the first membership card identification information is used, the second shop being a shop where a second membership card identified by the second membership card identification information, second determination means for determining, in the case where the first membership card identification information and the second membership card identification information are linked to the single user identification information, whether or not a difference between a time and date when the first membership card is used at the first shop and a time and date where the second membership card is used at the second shop is small based on a predetermined determination criterion, and means for restricting use of at least one of the first membership card and the second membership card based on a result of determination by the first determination means and a result of determination by the second determination means.

In one embodiment of the present invention, the point system may further include participation request receiving means for receiving from the user a participation request for participating in a campaign conducted at the actual shop; participation situation information storage means for storing participation situation information in association with the user identification information, the participation situation information indicating whether or not the participation request is already received from the user identified by the user identification information; and means for increasing or decreasing points to be imparted in a case where the user buys or uses a product or a service at the actual shop while presenting the membership card, based on the participation situation information stored in association with the user identification information linked to the membership card identification information of the membership card.

Advantageous Effects of Invention

According to the present invention, it is possible to use points imparted in an electronic commerce transacted before completion of registration of a membership card such as a point card or the like, using the membership card after completion of the registration.

BRIEF DESCRIPTION OF DRAWINGS

FIG. 8 shows one example of a registration screen;
FIG. 9 shows one example of the list screen;
FIG. 10 shows one example of a user table;
FIG. 11 shows one example of a point history table;
FIG. 12 shows one example of an actual shop table;
FIG. 13 shows one example of a membership card table;
FIG. 14 shows one example of the point history table;
FIG. 15 shows one example of a link table;
FIG. 25 shows one example of change of the membership card table;
FIG. 26 shows one example of change of the user table;
FIG. 35 shows one example of a campaign screen;
FIG. 36 shows one example of a campaign table;
FIG. 37 shows one example of an participation situation table;
FIG. 44 shows one example of the membership card table;
FIG. 45 shows one example of the point history table;
FIG. 46 shows one example of the link table.

DESCRIPTION OF EMBODIMENTS

In the following, an example of an embodiment of the present invention will be described in detail based on the drawings.

First Embodiment

Figure 1:
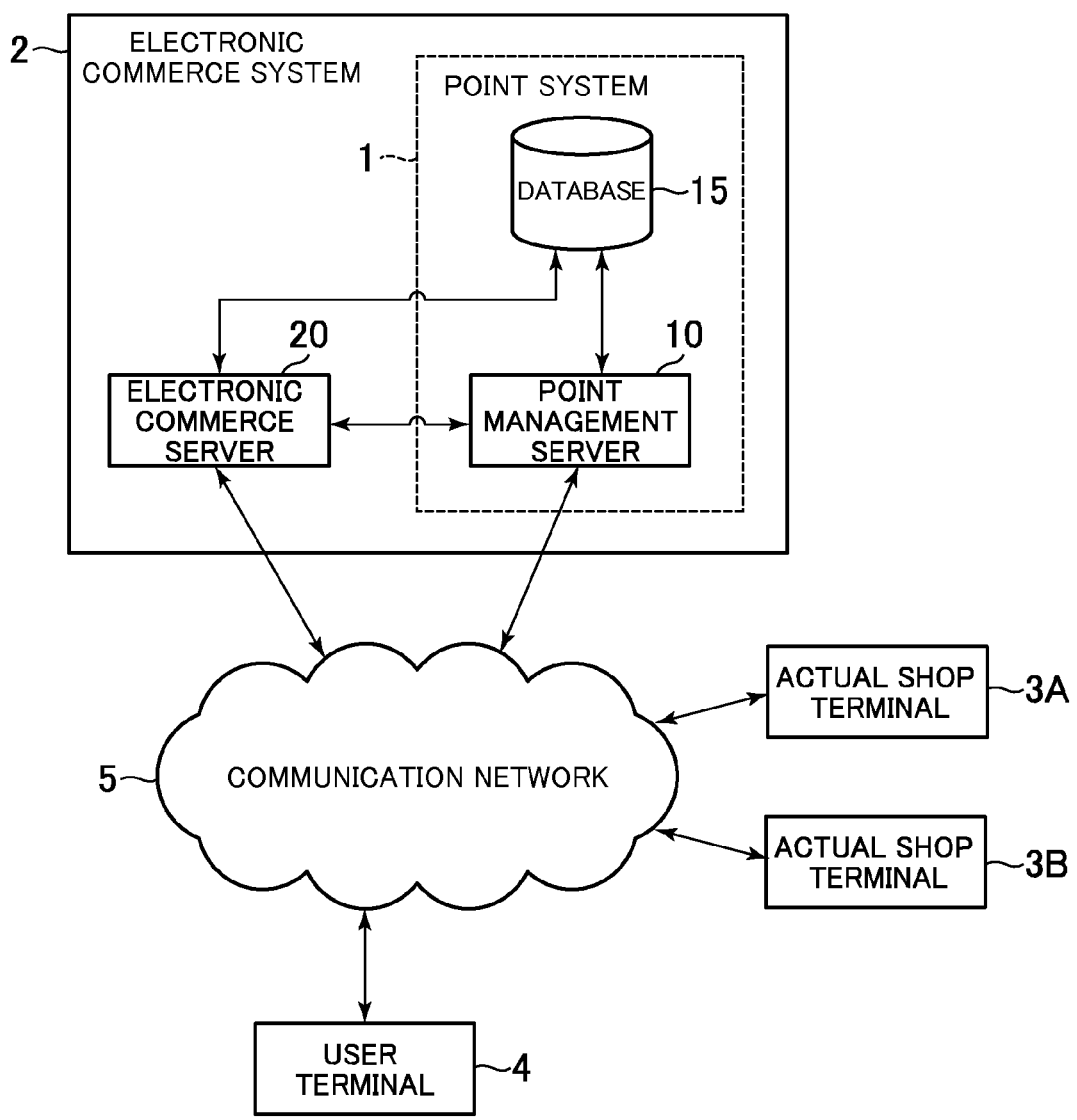
FIG. 1 shows one example of an overall structure of a point system according to an embodiment of the present invention.

A first embodiment of the present invention will be described. FIG. 1 shows one example of a structure of a point system according to a first embodiment of the present invention.

A point system 1 according to the first embodiment is a system for providing a point service. In the point service, points are imparted to a user having bought or used a product or a service. The user can receive a variety of privileges based on the points. For example, the user can use the points in buying a product or using a service at the next and thereafter times. For example, the points can be appropriated for all or a part of payment based on 1 point=1 JPY.

The point system 1 provides the point service to a user of an electronic commerce system 2. Further, the point system 1 provides the point service to a user of an actual shop as well, as to be described later.

In the example shown in FIG. 1, the point system 1 is included in the electronic commerce system 2 so as to be formed as a part of the electronic commerce system 2. However, the point system 1 may be formed as a separate system from the electronic commerce system 2.

Figure 2:
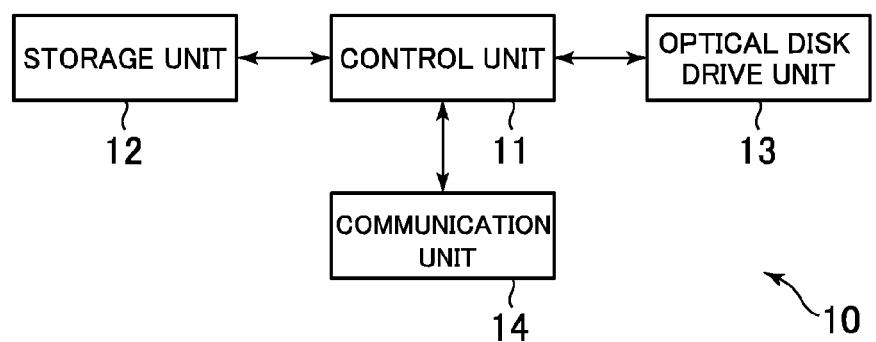
FIG. 2 shows one example of a hardware structure of a point management server.

The point system 1 includes a point management server 10 (a point management device) and a database 15. FIG. 2 shows one example of a hardware structure of the point management server 10. As shown in FIG. 2, the point management server 10 includes a control unit 11, a storage unit 12, an optical disk drive unit 13, and a communication unit 14.

The control unit 11 includes, for example, one or more microprocessors, and executes processing according to an operating system or a program stored in the storage unit 12. The storage unit 12 includes a main memory unit and an auxiliary memory unit. For example, the main memory unit is a RAM, and the auxiliary memory unit is a hard disk, a solid state drive, or the like.

The optical disk drive unit 13 reads a program and data recorded on an optical disk (an information storage medium). The program and data is supplied to the storage unit 12 via an optical disk. That is, a program and data recorded on an optical disk is read by the optical disk drive unit 13 to be stored in the storage unit 12.

Note that the point management server 10 may include a structural element for reading a program or data stored in an information storage medium other than an optical disk (for example, a memory card), and the program and data may be supplied to the storage unit 12 via an information storage medium other than an optical disk.

The communication unit 14 is a device for data communication via the communication network 5. A program and data may be supplied to the storage unit 12 via the communication network 5.

The point management server 10 can access the database 15. The database 15 may be created in the point management server 10 or a server other than the point management server 10. Information necessary to provide a point service is stored in the database 15. Information stored in the database 15 will be described later.

The electronic commerce system 2 is a system for implementing an electronic commerce. The electronic commerce system 2 includes an electronic commerce server 20. The electronic commerce server 20 has a hardware structure similar to that of the point management server 10.

For example, the electronic commerce system 2 implements a virtual shopping mall where a plurality of shops are open. The electronic commerce server 20 is a virtual shopping mall server that functions as a portal of the virtual shopping mall. Data communication is possible between the electronic commerce server 20 and the point management server 10.

The electronic commerce server 20 can access the database 15. In the database 15, information that is necessary to provide an electronic commerce (a virtual shopping mall) as well is stored. For example, information on a user who uses the virtual shopping mall, information on a shop that is open in the virtual shopping mall, information on a product dealt in the virtual shopping mall, information on a transaction performed in the virtual shopping mall, or the like, are stored in the database 15. A database for the electronic commerce may be created separately from a database for the point service.

Actual shop terminals 3A, 3B are each an information processing device installed in an actual shop. A shop that actually (physically) exists (for example, a shop or the like where products are exhibited for sale) will be referred to as the "actual shop" in order to discriminate from a virtual shop in the virtual shopping mall.

For example, the actual shop terminals 3A, 3B are each a POS (Point Of Sale) register. The actual shop terminals 3A, 3B each have a function for reading a bar code or a magnetic code, and can read bar codes or magnetic codes of various cards and a bar code displayed on a display unit of a portable terminal. Data communication is possible between each of the actual shop terminals 3A, 3B and the point management server 10 via the communication network 5.

The point service is provided at the actual shop as well. That is, at the actual shop, a membership card (for example, a point card) is issued to a user, and points are imparted to the user who presents the membership card in buying a product or using a service. By presenting the membership card in buying a product or using a service, the user can appropriate the points for all or a part of payment. Such a point service at the actual shop is provided by the point system 1.

Note that the actual shop terminals 3A, 3B may be hereinafter collectively referred to as an "actual shop terminal 3". In the following, an actual shop where the actual shop terminal 3A is installed may be referred to as an "actual shop A", and an actual shop where the actual shop terminal 3B is installed may be referred to as an "actual shop B".

A user terminal 4 is an information processing device for use by a user. For example, the user terminal 4 is a personal computer, a portable phone (including a smart phone), a portable information terminal, or the like. The user terminal 4 includes a control unit, a storage unit, a communication unit, an operation unit, a communication unit, and a display unit.

In the point service provided by the point system 1 according to the first embodiment, a user can use points imparted in the virtual shopping mall at the actual shop. Further, the user can use points imparted at an actual shop in the virtual shopping mall. Still further, the user can use points imparted at an actual shop at another actual shop.

Figure 3:
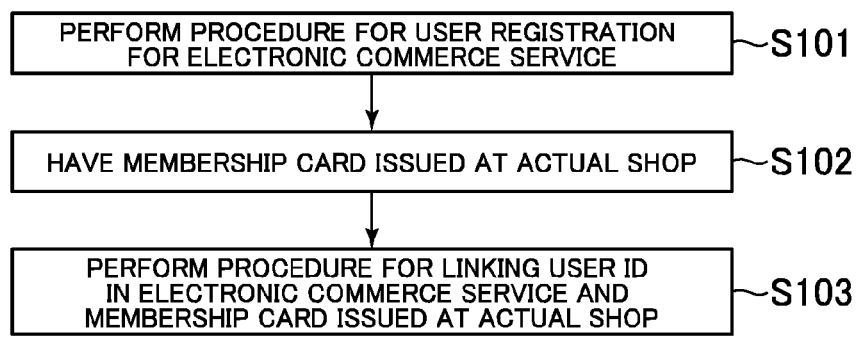
FIG. 3 explains one example of a procedure to be performed by a user to use a point service.

Below, a procedure to be performed by a user in order to use the above described point service will be described. FIG. 3 shows a procedure to be performed by a user who have not used neither an electronic commerce service (a virtual shopping mall) nor a point service at an actual shop yet.

As shown in FIG. 3, initially, the user performs a procedure for user registration in order to use the electronic commerce service (S101). For example, the user accesses a web page for user registration provided by the electronic commerce server 20 from the user terminal 4. Then, the user inputs their own information (for example, a name, a password, an address, a mail address, or the like) on a user registration screen displayed on the display unit of the user terminal 4. The information inputted on the user registration screen is sent to the electronic commerce server 20 to be stored in the database 15.

After completion of the procedure at step S101, the user can buy a product in the virtual shopping mall. When the user buys a product in the virtual shopping mall, points in accordance with the purchase price are imparted. The user can use the points at next shopping in the virtual shopping mall. That is, the user can appropriate the points for all or a part of payment at next shopping.

Figures 4, 5:
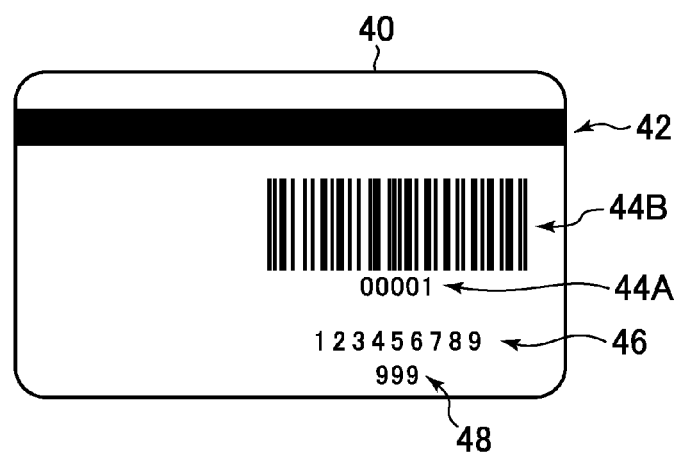
FIG. 4 shows one example of an order screen.
FIG. 5 shows one example of a point card.

FIG. 4 shows one example of an order screen that is displayed in buying a product at the virtual shopping mall. On the order screen 30 shown in FIG. 4, the amount of points which the user can earn in buying a product this time is shown. The amount of points to be imparted to the user is determined in accordance with the purchase price. In the example shown in FIG. 4, the amount of points corresponding to 10% of the purchase price are imparted to the user.

On the order screen 30 shown in FIG. 4, the point balance of the user is shown. In the example shown in FIG. 4, as the point balance of the user is 500 points, the user can appropriate 500 points for a part of payment. To use the points, the user checks the check box 32, and then clicks an order button 34. Meanwhile, when the user does not use the points, the user clicks the order button 34 leaving the check box 32 unchecked. In the case where the point balance of the user is zero, the check box 32 is not displayed.

As shown in FIG. 3, the user has a membership card (a point card) for use issued at the actual shop (S102). For example, the managing company of the point system 1 has distributed membership cards in advance to the actual shop, and the membership card distributed by the managing company of the point system 1 is issued to the user at the actual shop.

FIG. 5 shows one example of a point card to be issued as the membership card at the actual shop. The point card 40 shown in FIG. 5 includes a magnetic stripe 42. In addition, a membership card ID 44A and a bar code 44B are printed on the point card 40. The membership card ID 44A is identification information for uniquely identifying a membership card; the bar code 44B is a bar code indicating the membership card ID 44A.

A card ID 46 and a security code 48 as well are printed on the point card 40. The card ID 46 is used by the managing company of the point system 1 to manage the stock of the point cards 40. The security code 48 is used to enhance security of the point card 40. Note that an ID same as the ID indicated by the bar code 44B may be recorded on the magnetic stripe 42, or an ID different from the ID indicated by the bar code 44B may be recorded on the magnetic stripe 42.

A program for causing a portable terminal (for example, a portable phone) to function as the membership card may be installed in the portable terminal, and such a portable terminal may be used as the membership card instead of the point card 40 (see FIG. 39 to be described later).

After completion of the procedure at step S102, the user can earn points by presenting the membership card in buying a product or using a service at the actual shop. At this moment, the membership card is temporary yet. That is, the membership card is in a state where it is possible to earn points but not to use the points.

Note that the procedures at steps S101 and S102 may be performed irrespective of the order. That is, the procedure at step S102 may be performed first and followed by step S101.

As shown in FIG. 3, after completion of the procedures at steps S101 and S102, the user performs a procedure for linking the user ID used in the electronic commerce service (the virtual shopping mall) and the membership card issued at the actual shop (S103). For example, the user access a web page provided by the point management server 10 from the user terminal 4. In this case, a log-in screen 50, such as is shown in FIG. 6, for example, is displayed on the display unit of the user terminal 4.

Figure 6:
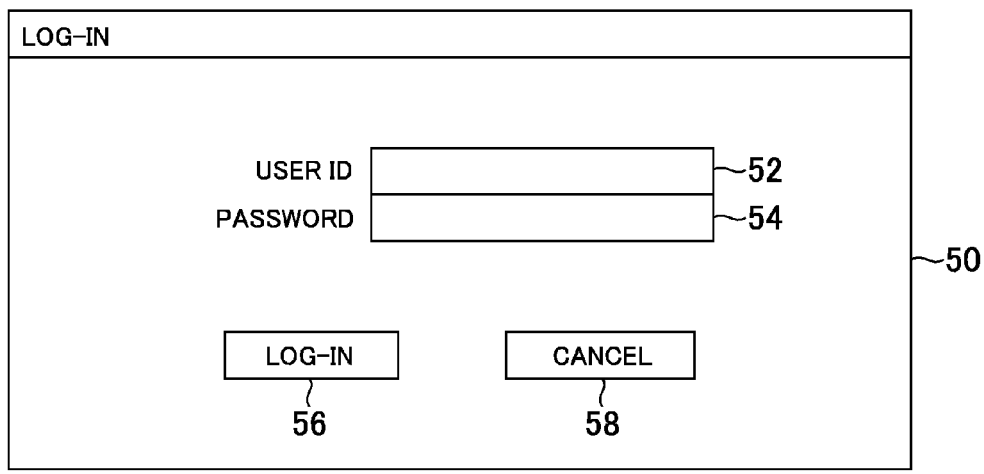
FIG. 6 shows one example of a log-in screen.

The log-in screen 50 shown in FIG. 6 includes an input space 52 for inputting a user ID, and an input space 54 for inputting a password. The user inputs the user ID and the password used in the electronic commerce service (the virtual shopping mall) in the respective input spaces 52, 54, and then clicks a log-in button 56. Note that a cancel button 58 is a button to stop the ongoing procedure.

Figure 7:
FIG. 7 shows one example of a list screen.

When the log-in button 56 is clicked, the user ID and the password inputted in the respective input spaces 52, 54 are sent to the point management server 10 to determine whether or not the combination of the user ID and the password is authentic. When it is determined that the combination of the user ID and the password is authentic, a list screen 60, such as is shown in FIG. 7, for example, is displayed on the display unit of the user terminal 4.

The list screen 60 is a screen showing a list of membership cards linked to the user ID inputted on the log-in screen 50. FIG. 7 shows the list screen 60 with no membership card linked to the user ID. As shown in FIG. 7, only a new registration button 62 is shown on the list screen 60 in this state. When the new registration button 62 is clicked, the registration screen 70, such as is shown in FIG. 8, for example, is displayed. Note that in the case where no membership card is linked to the user ID, the registration screen 70 may be displayed without displaying the list screen 60.

The registration screen 70 shown in FIG. 8 includes an input space 72 for inputting a membership card ID and an input space 74 for inputting a security code. The user inputs the membership card ID 44A and the security code 48 printed on the point card 40 issued at the actual shop in the respective input spaces 72, 74, and then clicks a registration button 76. When the registration button 76 is clicked, a link between the user ID used in the electronic commerce service (the virtual shopping mall) and the membership card issued at the actual shop is registered in the database 15. Note that the cancel button 78 is a button to stop the ongoing procedure.

Note that a user who has two or more membership cards issued at two or more actual shops can have these membership cards linked to their own user ID. In this case, the user repetitively perform the procedure at step S103.

FIG. 9 shows one example of the list screen 60 with two or more membership cards of the user linked to their own user ID. Specifically, FIG. 9 shows the list screen 60 displayed when the user has their membership cards issued at the respective actual shops A and B linked to their own user ID.

The list screen 60 shown in FIG. 9 shows a list 64 of membership cards linked to the user ID. Information on the membership card is shown in the list 64. In the example shown in FIG. 9, the list 64 includes "membership card ID", "shop name", "type", and "valid" fields.

The "shop name" field shows the name of an actual shop that has issued the membership card. The "type" field indicates the type of the membership card. That is, the "type" field indicates which of the point card 40 and the portable terminal (see FIG. 39 to be described later) the membership card is.

The "valid" field indicates whether or not the membership card is valid. When the membership card is valid, it is possible to earn or use points by presenting the membership card at the actual shop. Meanwhile, when the membership card is not valid, it is not possible to use points. That is, when the membership card is not valid, it is possible to earn points by presenting the membership card at the actual shop but not to use the points. Alternatively, it may be arranged such that it is also not possible to earn points when the membership card is not valid.

The user can change the state of validity of the membership card. The link button 66 displayed in association with each membership card is used to change the state of validity of the membership card. As shown in FIG. 9, when the membership card is valid, the link button 66 for invalidating the membership card is displayed. Meanwhile, when the membership card is not valid, a link button for validating the membership card is displayed.

The user can change the validity state of the membership card by clicking the link button 66. For example, a user who has lost their membership card can invalidate the membership card. Once the membership card is invalidated, the points is no longer usable. This can prevent unauthorized use of the membership card by another person who has obtained the membership card.

After completion of the procedure at step S103 in FIG. 3, the membership card issued at the actual shop becomes no longer temporary. With the above, it becomes possible to use the points at the actual shop.

Further, after completion of the procedure at step S103 in FIG. 3, the user can use points earned in the virtual shopping mall at the actual shop. In the case where the membership cards issued at the actual shops A and B are linked to the user ID used in the virtual shopping mall, as shown in FIG. 9, for example, the user can use the points earned in the virtual shopping mall at the actual shops A and B.

Still further, after completion of the procedure at step S103 in FIG. 3, the user can use the points earned at the actual shop in the virtual shopping mall. For example, in the case where the membership cards issued at the actual shops A and B are linked to the user ID used in the virtual shopping mall as shown in FIG. 9, the user can use the points earned at the actual shops A and B in the virtual shopping mall. For example, on the order screen 30, the total number of the points earned by the user in the virtual shopping mall, the points earned by the user at the actual shop A, and the points earned by the user at the actual shop B is shown as the point balance of the user.

Yet further, after completion of the procedure at step S103 in FIG. 3, the user can use the points earned at an actual shop at another actual shop. For example, as shown in FIG. 9, in the case where the membership cards issued at the actual shops A and B are linked to the user ID used in the virtual shopping mall, the user can use the points earned at the actual shop A at the actual shop B.

In the following, a structure for implementing the above described point service will be described. Initially, information stored in the database 15 will be described. FIGS. 10 to 15 show one example of the information stored in the database 15.

FIG. 10 shows one example of a user table. The user table shows a list of users who use the virtual shopping mall. For example, the user table includes "user ID", "password", "user name", "address", "mail address", and "point balance" fields.

In the "user ID" field, identification information for uniquely identifying a user is registered. A user ID may be designated by the user or automatically determined by the electronic commerce server 20. In the "password" field, a password designated by the user is registered.

In the "user name", "address", and "mail address" fields, the name, address, and mail address of the user are respectively registered. The "point balance" field shows the balance of points earned by the user in the virtual shopping mall.

FIG. 11 shows one example of a point history table. The point history table shown in FIG. 11 shows a history of earning or using points by each user in the virtual shopping mall. For example, the point history table includes "ID", "time and date", "user ID", "earned point", and "used point" fields.

In the "ID" field, identification information for uniquely identifying each record in the point history table is registered. In the "time and date" field, a time and date when points has been earned or used is registered. In the "user ID" field, the user ID of a user who has earned or used the points is registered.

In the "earned point" field, the amount of points earned by the user by buying a product or the like is registered. The "earned point" field includes "basic" and "bonus" fields. For example, the amount of points obtained by multiplying a predetermined percentage to a purchase price are imparted to the user having bought a product as basic points. In addition, during a special period, such as a period of a campaign or the like conducted at a shop, bonus points may be imparted to the user in addition to the above mentioned basic points. The "basic" field indicates the basic points earned by the user; the "bonus" field indicates the bonus points earned by the user. In the "used point" field, the amount of points used by the user in buying a product or the like is registered.

FIG. 12 shows one example of an actual shop table. The actual shop table shows a list of actual shops that are members of the point service provided by the point system 1. For example, the actual shop table includes "actual shop ID", "shop name", "postcode", "address", and "telephone number" fields. In the "actual shop ID" field, identification information for uniquely identifying an actual shop is registered. The name, postcode, address, and telephone number of the actual shop are registered in the "shop name", "postcode", "address", and "telephone number" fields, respectively.

FIG. 13 shows one example of a membership card table. The membership card table shows a list of membership cards for use at respective actual shops. For example, the membership card table includes a list of point cards 40 distributed to the respective actual shops by the managing company of the point system 1. In addition, the membership card table also includes a list of portable terminals that are used as a membership card instead of the point card 40.

For example, the membership card table includes "membership card ID", "card ID", "security code", "magnetic code", "actual shop ID", "type", "validity flag", "link flag", and "point balance" fields.

In the "membership card ID" field, identification information for uniquely identifying a membership card is registered. In the "card ID" and "security code" fields, the card ID 46 and the security code 48 printed on the point card 40 are registered, respectively. In the "magnetic code" field, a magnetic code recorded on the magnetic stripe 42 of the point card 40 is registered. In the "actual shop ID" field, the actual shop ID of the actual shop that has issued the membership card is registered.

The "type" field indicates the type of the membership card. For example, either the value "0" or "1" is registered in the "type" field. The value "0" indicates that the membership card is a point card 40; the value "1" indicates that the membership card is a portable terminal (see FIG. 39 to be described later).

The "validity flag" field indicates whether or not the membership card is valid. For example, either the value "0" or "1" is registered in the "validity flag" field. The value "0" indicates that the membership card is not valid; the value "1" indicates that the membership card is valid. Note that, as described above, when the membership card is not valid, use of points is restricted. That is, when the membership card is not valid, it is possible to earn points but not to use the points.

The "link flag" field indicates whether or not the membership card is linked to the user ID used in the virtual shopping mall. For example, either the value "0" or "1" is registered in the "link flag" field. The value "0" indicates that the membership card is not linked to the user ID; the value "1" indicates that the membership card is linked to the user ID.

Note that before completion of the procedure at step S103 in FIG. 3, the value "0" is set in the "validity flag" and "link flag" fields.

In the "point balance" field, the remaining of the points imparted to the membership card is registered.

FIG. 14 shows one example of a point history table. The point history table shown in FIG. 14 differs from the point history table shown in FIG. 11 in that the former shows a history of earning or using points at the respective actual shops.

The point history table shown in FIG. 14 includes "ID", "time and date", "membership card ID", "actual shop ID", "earned point", and "used point" fields. The fields other than the "membership card ID" and the "actual shop ID" fields are similar to those in the point history table shown in FIG. 11.

In the "membership card ID" field, the membership card ID of a membership card presented by a user when buying a product or using a service is registered. In the "actual shop ID" field, the actual shop ID of an actual shop where the user has bought or used the product or the service is registered.

FIG. 15 shows one example of a link table. A link table shows a link between the user ID used in the virtual shopping mall and the membership card used at the actual shop. For example, when the registration button 76 on the registration screen 70 is clicked, a combination of the user ID inputted in the input space 52 on the log-in screen 50 and the membership card ID inputted in the input space 72 on the registration screen 70 is additionally registered in the link table.

Figure 16:
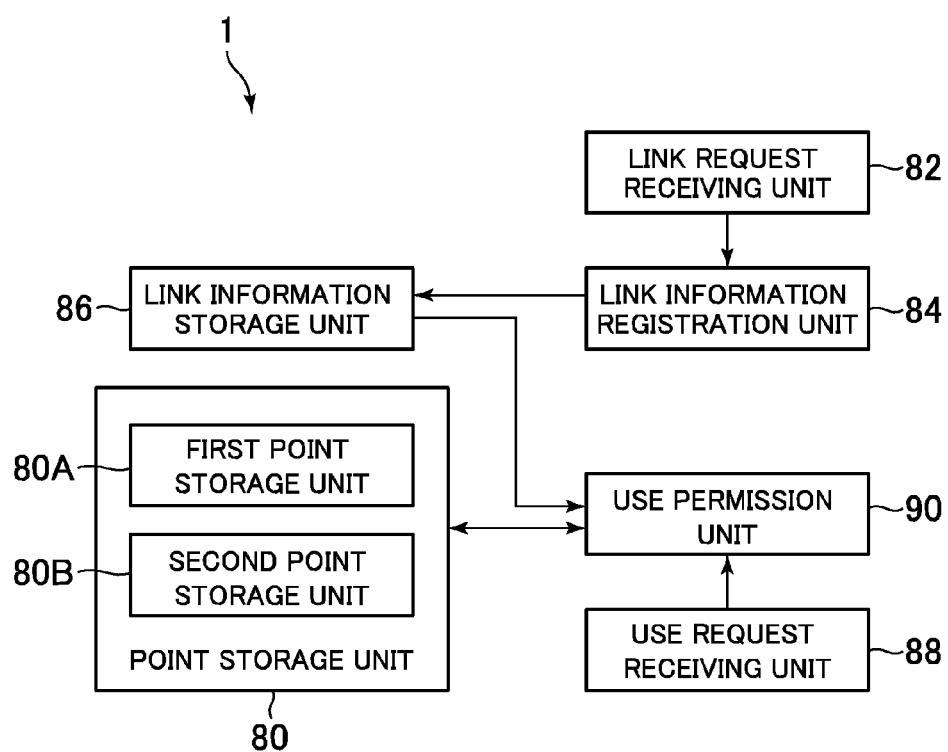
FIG. 16 is a function block diagram of the point system.

In the following, function blocks implemented in the point system 1 will be described. FIG. 16 is a function block diagram showing function blocks implemented in the point system 1. As shown in FIG. 16, the point system 1 includes a point storage unit 80, a link request receiving unit 82, a link information registration unit 84, a link information storage unit 86, a use request receiving unit 88, and a use permission unit 90.

For example, the point storage unit 80 and the link information storage unit 86 are implemented using the database 15. Further, for example, the link request receiving unit 82, the link information registration unit 84, the use request receiving unit 88, and the use permission unit 90 are implemented by the control unit 11 of the point management server 10. For example, the control unit 11 executes processing according to a program, thereby functioning as these function blocks.

The point storage unit 80 includes a first point storage unit 80A and a second point storage unit 80B. The first point storage unit 80A stores the amount of points imparted to a user in the virtual shopping mall in association with a user ID of the user used in the virtual shopping mall (the electronic commerce service). For example, the first point storage unit 80A stores the user table (in particular, the "user ID" and "point balance" fields), such as is shown in FIG. 10.

The second point storage unit 80B stores the amount of points, which are imparted to a membership card ID for identifying a membership card for receiving points at an actual shop, in association with the membership card ID. For example, the second point storage unit 80B stores the membership card table (in particular, the "membership card ID" and "point balance" fields) such as is shown in FIG. 13.

The link request receiving unit 82 receives a link request for linking a user ID and a membership card ID. When the link request is received, the link information registration unit 84 registers link information indicating a link between the user ID and the membership card ID in the link information storage unit 86.

For example, the link information storage unit 86 stores the link table, such as is shown in FIG. 15. For example, when the registration button 76 on the registration screen 70 is clicked, the combination of the user ID inputted in the input space 52 on the log-in screen 50 and the membership card ID inputted in the input space 72 on the registration screen 70 is sent from the user terminal 4 to the point management server 10. The link request receiving unit 82 receives the combination of the user ID and the membership card ID as the link request. The link information registration unit 84 additionally registers the combination of the user ID and the membership card ID in the link table.

The use request receiving unit 88 receives a point use request with a designation of a membership card ID. For example, when a user wants to use points by presenting the membership card at an actual shop, the bar code 44B of the membership card (the point card 40) is read at the actual shop terminal 3, and a point use request including the membership card ID is sent to the point management server 10. The use request receiving unit 88 receives such a point use request.

When the point use request with a designation of the membership card ID is received, the use permission unit 90 permits use of the points stored in association with the user ID linked to the membership card ID.

Below, with reference to FIGS. 10, 13, 15, an operation of the use permission unit 90 will be described. Note that a user having a user ID "U0001" will be referred to as a "user X"; an actual shop having an actual shop ID "S0001" will be referred to as an "actual shop A"; an actual shop having an actual shop ID "S0002" will be referred to as an "actual shop B". Assume here a case in which the user X presents a membership card having the membership card ID "00001" at the actual shop A, and tells that they want to use points.

In such a case, a point use request including the membership card ID "00001" is sent to the point management server 10. Then, the use permission unit 90 permits use of the points (200 points: see FIG. 13) stored in association with the membership card ID "00001".

Further, as the user ID "U0001" is linked to the membership card ID "00001" (see FIG. 15), the use permission unit 90 permits use of the points (100 points: see FIG. 10) stored in association with the user ID "U0001" as well.

Still further, as another membership card ID "00101" is also linked to the user ID "U0001" (see FIG. 15), the use permission unit 90 permits use of the points (300 points: see FIG. 13) stored in association with the membership card ID "00101" as well. That is, the use permission unit 90 permits use of 600 points in total.

Note that the use request receiving unit 88 may receive a point use request with a designation of a user ID. For example, when a user wants to use points in the virtual shopping mall, a point use request including the user ID used in the virtual shopping mall is sent from the electronic commerce server 20 to the point management server 10. The use request receiving unit 88 receives such a point use request.

When the point use request with a designation of the user ID is received, the use permission unit 90 permits use of the points stored in association with the membership card ID linked to the user ID.

Here again, referring to FIGS. 10, 13, 15, an operation of the use permission unit 90 will be described. Assume a case in which the user X tells that they want to use points in the virtual shopping mall. In such a case, a point use request including the user ID "U0001" of the user X is sent to the point management server 10. Then, the use permission unit 90 permits use of the points (100 points: see FIG. 10) stored in association with the user ID "U0001".

Further, as the membership cards IDs "00001" and "00101" are linked to the user ID "U0001" (see FIG. 15), the use permission unit 90 permits use of the points (200 points: see FIG. 13) stored in association with the membership card ID "00001" and the points (300 points: see FIG. 13) stored in association with the membership card ID "00101" as well. That is, the use permission unit 90 permits use of 600 points in total.

Figure 17:
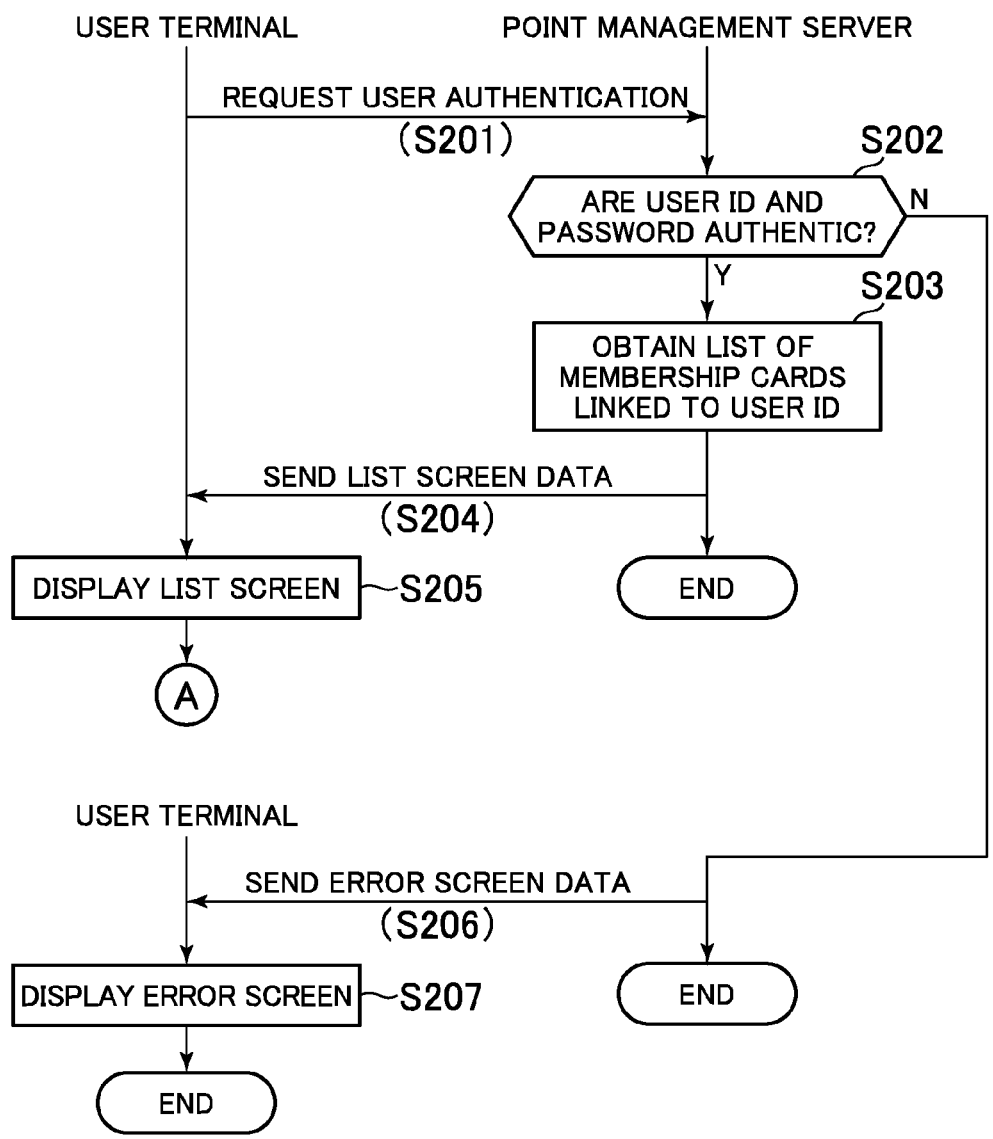
FIG. 17 shows one example of processing executed in the point system.
Figure 18:
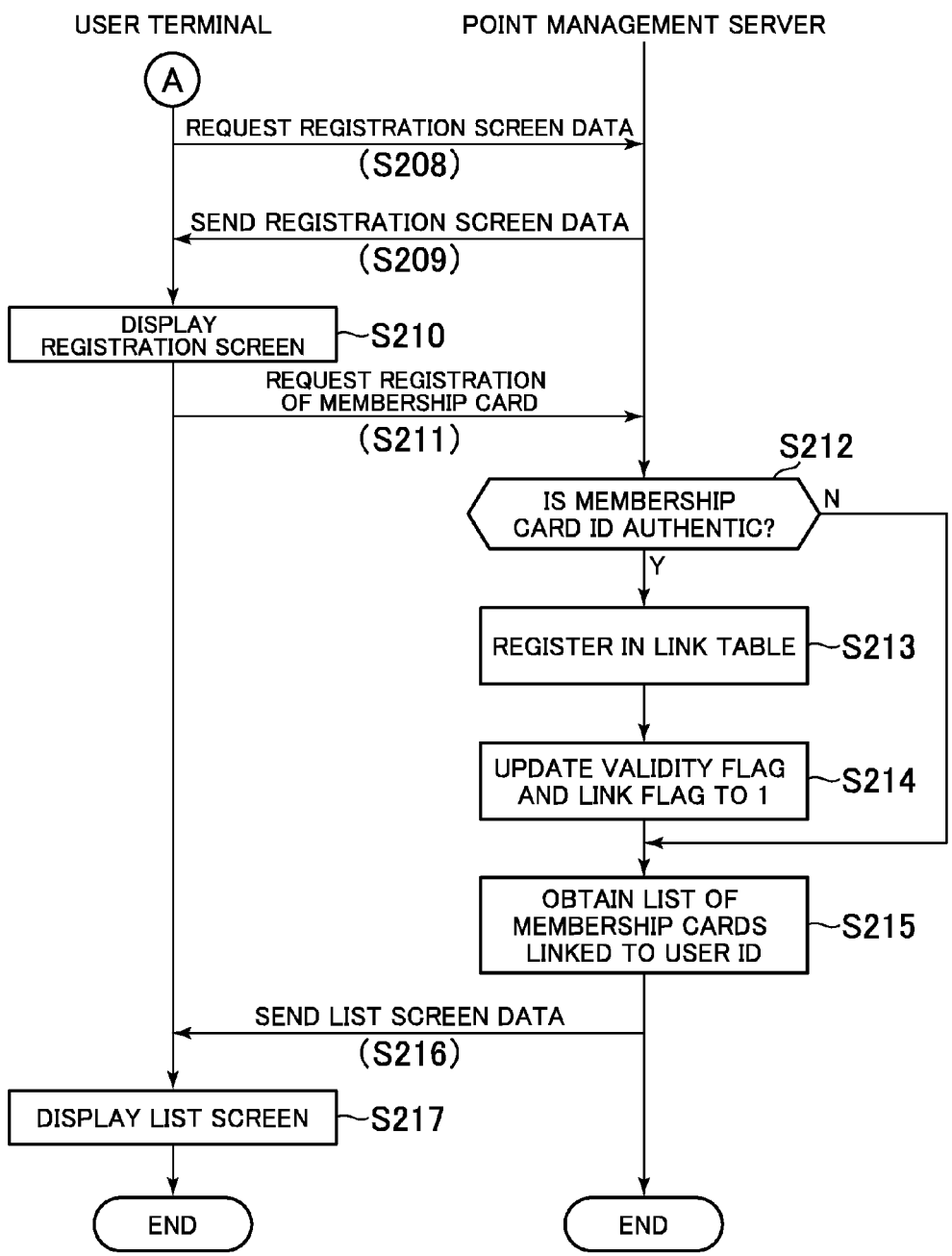
FIG. 18 shows one example of processing executed in the point system.

In the following, processing that is executed in the point system 1 will be described. FIGS. 17 and 18 show one example of processing that is executed when the log-in button 56 on the log-in screen 50 is clicked. The control unit 11 of the point management server 10 executes the processing shown in FIGS. 17, 18 according to a program, thereby functioning as the link request receiving unit 82 and the link information registration unit 84.

As shown in FIG. 17, when the log-in button 56 is clicked, the control unit of the user terminal 4 requests the point management server 10 to perform user authentication (S201). In this case, the user ID and the password inputted in the respective input spaces 52, 54 on the log-in screen 50 are sent to the point management server 10.

The control unit 11 of the point management server 10 refers to the user table to determine whether or not the combination of the user ID and the password received from the user terminal 4 is authentic (S202). When the combination of the user ID and the password is not authentic, the control unit 11 sends error screen data to the user terminal 4 (S206). When the error screen data is received at the user terminal 4, the control unit of the user terminal 4 displays an error screen on the display unit (S207).

Meanwhile, when the combination of the user ID and the password is authentic, the control unit 11 refers to the link table and the membership card table to obtain the list of membership cards linked to the user ID (S203). Then, the control unit 11 sends data on the list screen 60 to the user terminal 4 (S204). When the data on the list screen 60 is received at the user terminal 4, the control unit of the user terminal 4 displays the list screen 60 on the display unit (S205).

As shown in FIG. 18, when the new registration button 62 on the list screen 60 is clicked, the control unit of the user terminal 4 requests the point management server 10 to send data on the registration screen 70 (S208). In this case, the control unit 11 sends the data on the registration screen 70 to the user terminal 4 (S209). When the data on the registration screen 70 is received, the control unit of the user terminal 4 displays the registration screen 70 on the display unit (S210).

When the registration button 76 on the registration screen 70 is clicked, the control unit of the user terminal 4 requests registration of the membership card (S211). That is, the control unit of the user terminal 4 sends the membership card ID and the security code inputted in the respective input spaces 72, 74 on the registration screen 70 to the point management server 10, and requests the point management server 10 to link the user ID inputted on the log-in screen 50 and the membership card ID inputted in the input space 72 on the registration screen 70.

When the above described request is received in the point management server 10, the control unit 11 determines whether or not the membership card ID received from the user terminal 4 is authentic (S212). Specifically, for example, when the membership card ID received from the user terminal 4 satisfies at least one of the conditions mentioned below, the control unit 11 determines that the membership card is not authentic.

(A) The membership card ID received from the user terminal 4 is not registered in the membership card table.
(B) The combination of the membership card ID and the security code received from the user terminal 4 is not registered in the membership card table.
(C) The membership card ID received from the user terminal 4 is already linked to any user ID.

When the membership card ID received from the user terminal 4 does not satisfy any of the above described conditions, the control unit 11 determines that the membership card ID is authentic. In this case, the control unit 11 registers the combination of the user ID (the user ID inputted on the log-in screen 50) and the membership card ID in the link table (S213). Further, the control unit 11 accesses the membership card table to update the "validity flag" and the "link flag" of the membership card ID from "0" to "1" (S214).

When step S214 is executed or when it is determined at step S212 that the membership card ID is not authentic, the control unit 11 refers to the link table and the membership card table to obtain a list of membership cards linked to the user ID (the user ID inputted on the log-in screen 50) (S215). Then, the control unit 11 sends data on the list screen 60 to the user terminal 4 (S216). Note that when it is determined at step S212 that the membership card ID is not authentic, the control unit 11 may send data on the list screen 60 on which a message showing that effect is shown to the user terminal 4.

When the data on the list screen 60 is received at the user terminal 4, the control unit of the user terminal 4 displays the list screen 60 on the display unit (S217).

Figure 19:
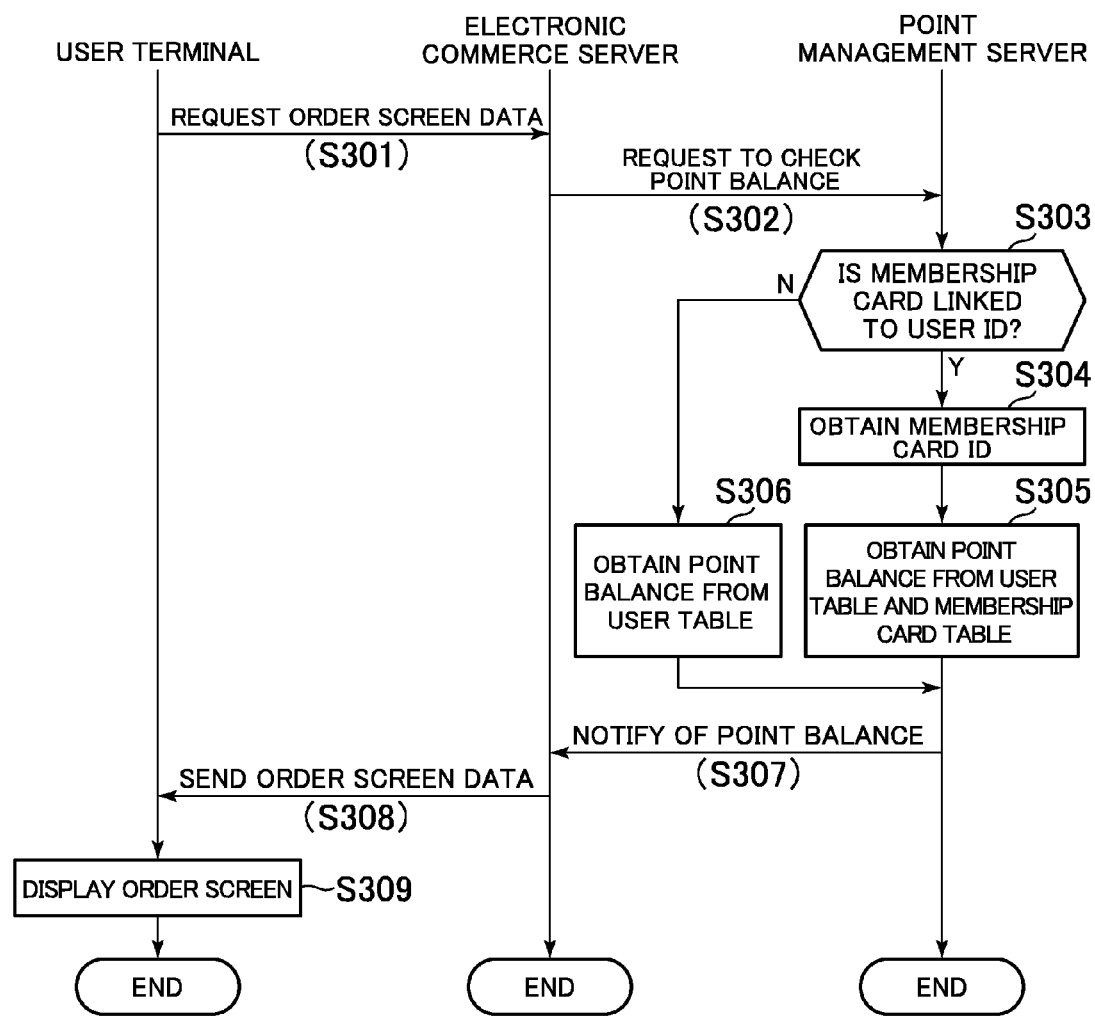
FIG. 19 shows another example of processing executed in the point system.

In the following, processing that is executed when a user buys a product in the virtual shopping mall will be described. FIG. 19 shows one example of processing that is executed to display the order screen 30 on the display unit of the user terminal 4. The control unit 11 of the point management server 10 executes the processing shown in FIG. 19 according to a program, thereby functioning as the use request receiving unit 88 and the use permission unit 90.

As shown in FIG. 19, initially, the control unit of the user terminal 4 requests the electronic commerce server 20 to send data on the order screen 30 (S301). In this case, information describing the content of an order made by the user is sent to the electronic commerce server 20 together with the user ID.

When the above described request is received in the electronic commerce server 20, the control unit of the electronic commerce server 20 requests the point management server 10 to check the point balance (S302). In this case, the user ID is sent to the point management server 10. When this request is received in the point management server 10, the control unit 11 refers to the link table to determine whether or not a membership card with the valid flag "1" is linked to the user ID received from the electronic commerce server 20 (S303). That is, the control unit 11 determines whether or not a valid membership card is linked to the user ID.

When a membership card with the validity flag "1" is linked to the user ID, the control unit 11 obtains the membership card ID of the membership card (S304). That is, the control unit 11 obtains the membership card ID of the valid membership card linked to the user ID received from the electronic commerce server 20.

Then, the control unit 11 obtains the point balance from the user table and the membership card table (S305). For example, when the user ID received from the electronic commerce server 20 at step S302 is "U0001" and the membership card IDs obtained at step S304 are "00001" and "00101", the control unit 11 obtains the total amount of the point balance of the user ID "U0001", the point balance of the membership card ID "00001", and the point balance of the membership card ID "00101" as the point balance.

Meanwhile, when it is determined at step S303 that the membership card with the validity flag "1" is not linked to the user ID, the control unit 11 obtains the point balance from the user table (S306). For example, when the user ID received from the electronic commerce server 20 at step S302 is "U0002", the control unit 11 obtains the point balance of the user ID "U0002".

After execution of step S305 or S306, the control unit 11 notifies the electronic commerce server 20 of the point balance obtained at step S305 or S306 (S307). When this notice is received in the electronic commerce server 20, the control unit of the electronic commerce server 20 sends data on the order screen 30 to the user terminal 4 (S308). In this case, data on the order screen 30 showing the point balance notified at step S307 is sent to the user terminal 4. When the data on the order screen 30 is received at the user terminal 4, the control unit of the user terminal 4 displays the order screen 30 on the display unit (S309).

Figure 20:
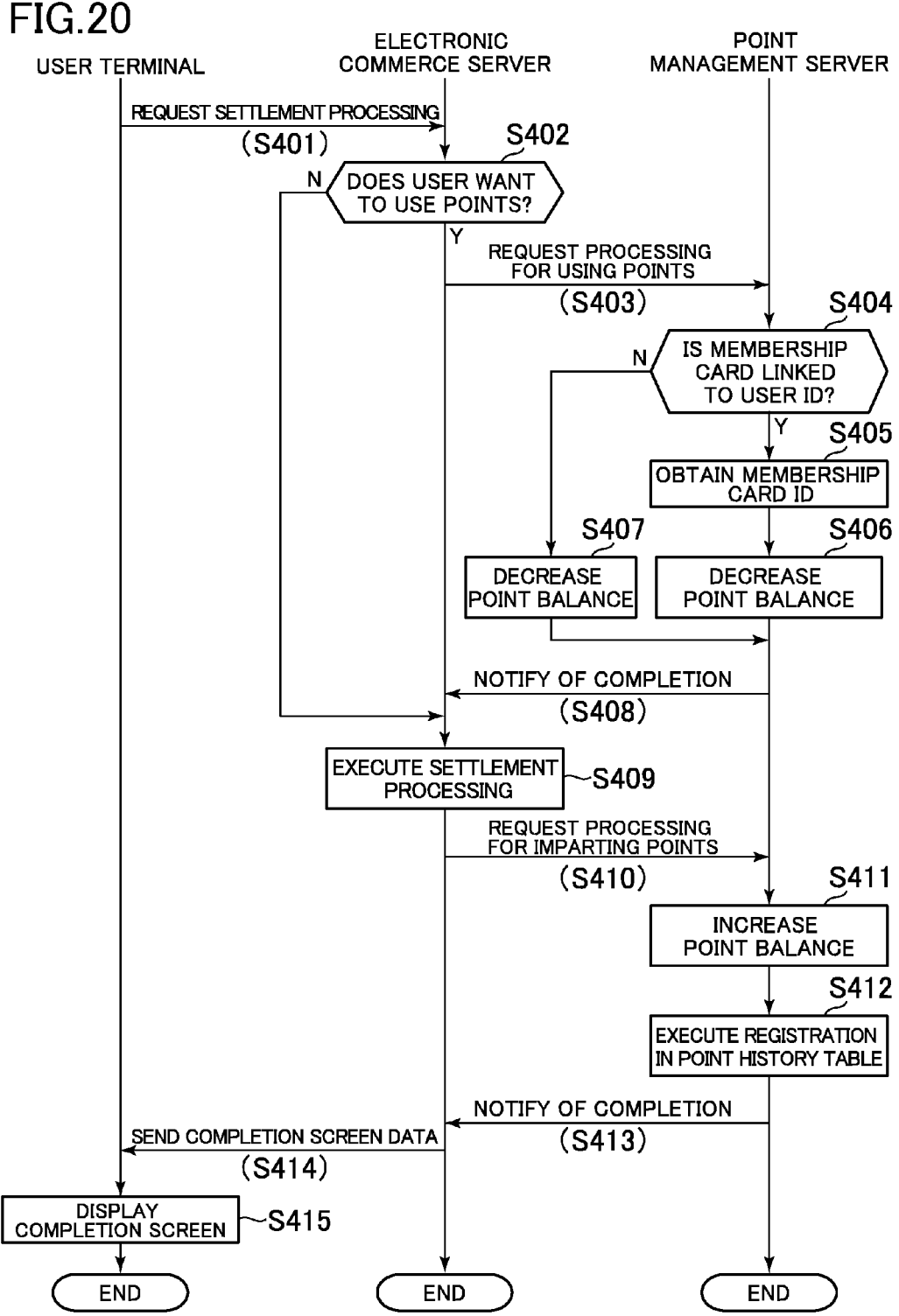
FIG. 20 shows another example of processing executed in the point system.

FIG. 20 shows one example of processing that is executed when the order button 34 on the order screen 30 is clicked. Note that although it is generally a case that a final confirmation screen is displayed when the order button 34 on the order screen 30 is clicked, it is described here for brevity of description based on an assumption that no final confirmation screen is displayed.

As shown in FIG. 20, initially, the user terminal 4 requests the electronic commerce server 20 to execute settlement processing (S401). In this case, for example, information describing the content of an order made by the user is sent to the electronic commerce server 20 together with the user ID. Note that the information describing the content of an order made by the user includes information as to whether or not the user wants to use points (that is, whether or not the check box 32 is checked) as well.

When the above described request is received in the electronic commerce server 20, the control unit of the electronic commerce server 20 determines whether or not the user wants to use points (S402). When the user wants to use points, the control unit requests the point management server 10 to execute processing for using points (S403). In this case, information indicating the amount of payment due to the user is sent to the point management server 10 together with the user ID.

When the above described request is received in the point management server 10, the control unit 11 refers to the link table to determine whether or not a membership card with the validity flag "1" is linked to the user ID received from the electronic commerce server 20 (S404). That is, the control unit 11 determines whether or not a valid membership card is linked to the user ID.

When a membership card with the validity flag "1" is linked to the user ID, the control unit 11 obtains the membership card ID of the membership card (S405). That is, the control unit 11 obtains the membership card ID of a valid membership card linked to the user ID received from the point management server 10.

Then, the control unit 11 decreases the point balance as to be described below (S406). Below, processing that is executed at step S406 will be described based on an assumption that the payment due to the user is 500 JPY, the user ID received from the electronic commerce server 20 at step S403 is "U0001", and the membership card IDs obtained at step S405 are "00001" and "00101".

In this case, initially, the control unit 11 refers to the user table to obtain the point balance of the user ID "U0001". In the example shown in FIG. 10, the point balance of the user ID "U0001" is 100 points. In this case, as the point balance of the user ID "U0001" is equal to less than the payment due to the user (500 JPY), all of the points of the user ID "U0001" are used. That is, the point balance of the user ID "U0001" is updated to 0. Further, in this case, the remaining of the payment due to the user becomes 400 JPY.

Further, the control unit 11 refers to the membership card table to obtain the point balance of the membership card ID "00001". In the example shown in FIG. 13, the point balance of the membership card ID "00001" is 200 points. In this case, as the point balance of the membership card ID "00001" is equal to or less than the remaining of the payment due to the user (400 JPY), all of the points of the membership card ID "00001" are used. That is, the point balance of the membership card ID "00001" is updated to 0. Further, in this case, the remaining of the payment due to the user becomes 200 JPY.

Still further, the control unit 11 refers to the membership card table to obtain the point balance of the membership card ID "00101". In the example shown in FIG. 13, the point balance of the membership card ID "00101" is 300 points. In this case, as the point balance of the membership card ID "00101" is greater than the remaining of the payment due to the user (200 JPY), the points of the membership card ID "00101" are used by the amount of points corresponding to the remaining of the payment due to the user (200 JPY). That is, the point balance of the membership card ID "00101" is decreasedby 200 points. Further, in this case, the remaining of the payment due to the user becomes 0 JPY.

Note that although the point of the membership card ID "00001" is used prior to that of the membership card ID "00101" here, the point of the membership card ID "00101" may be used prior to the point of the membership card ID "00001".

Meanwhile, when it is determined at step S404 that no membership card with the validity flag "1" is linked to the user ID, the control unit 11 decreases the point balance as to be described below (S407). Below, a case is assumed in which the payment due to the user is 500 JPY, and the user ID received from the electronic commerce server 20 at step S403 is "U0002".

In this case, the control unit 11 refers to the user table to obtain the point balance of the user ID "U0002". In the example shown in FIG. 10, the point balance of the user ID "U0002" is 50 points. In this case, as the point balance of the user ID "U0002" is equal to or less than the payment due to the user (500 JPY), all of the points of the user ID "U0002" are used. That is, the point balance of the user ID "U0002" is updated to 0. Further, in this case, the remaining of the payment due to the user becomes 450 JPY.

After execution of step S406 or S407, the control unit 11 notifies the electronic commerce server 20 of completion of processing for using the point (S408). In this case, the amount of points used and the remaining of the payment due to the user are notified to the electronic commerce server 20. Alternatively, either one of the amount of points used and the remaining of the payment due to the user may be notified to the electronic commerce server 20.

When the above described notice is received in the electronic commerce server 20, the control unit of the electronic commerce server 20 executes settlement processing based on the remaining of the payment due to the user (S409). Thereafter, the control unit requests the point management server 10 to execute processing for imparting points (S410). In this case, information indicating the amount of points to be imparted to the user and the amount of points used by the user is sent to the point management server 10 together with the user ID. Note that the amount of points to be imparted to a user who has used points may be determined based on the original amount of payment or the amount actually paid by the user.

When the above described request is received in the point management server 10, the control unit 11 accesses the user table to increase the point balance of the user ID received from the electronic commerce server 20 (S411). That is, the point balance of the user ID received from the electronic commerce server 20 is increased by the amount of points to be imparted to the user. Then, the control unit 11 executes registration in the point history table (S412). Thereafter, the control unit 11 notifies the electronic commerce server 20 of completion of the processing for imparting points (S413).

When this notice is received in the electronic commerce server 20, the control unit of the electronic commerce server 20 sends data on a completion screen to the user terminal 4 (S414). When the data on the completion screen is received at the user terminal 4, the control unit of the user terminal 4 displays the completion screen on the display unit (S415).

Note that although it is described in the above that the processing for imparting points is executed immediately after completion of the settlement processing, the processing for imparting points may be collectively executed during, for example, a time band with a fewer processing load (for example, at midnight).

Figure 21:
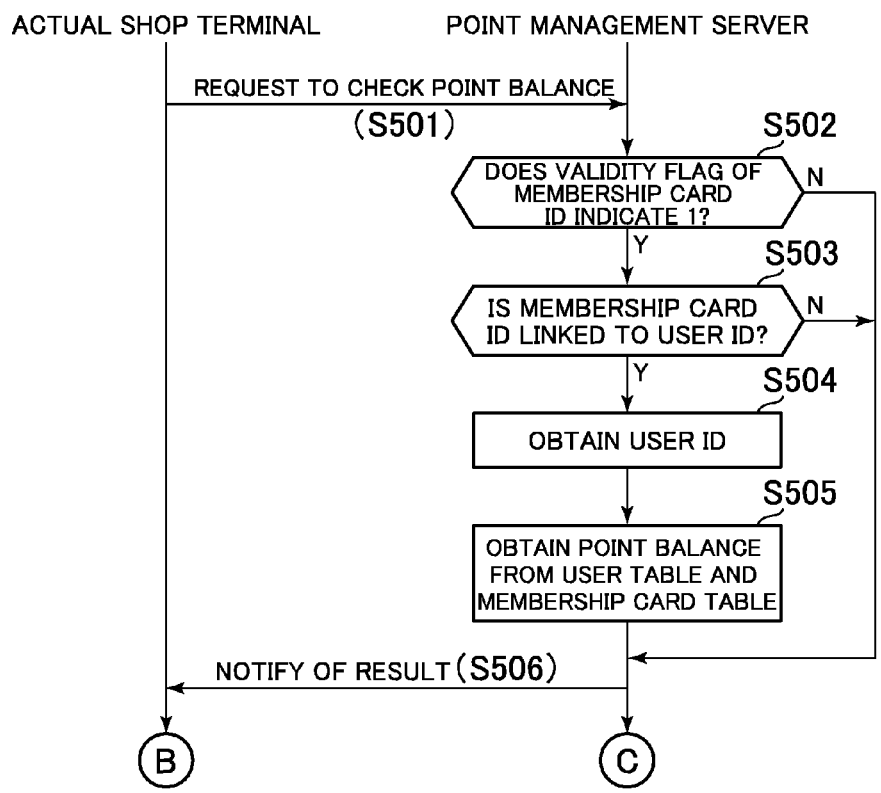
FIG. 21 shows another example of processing executed in the point system.
Figure 22:
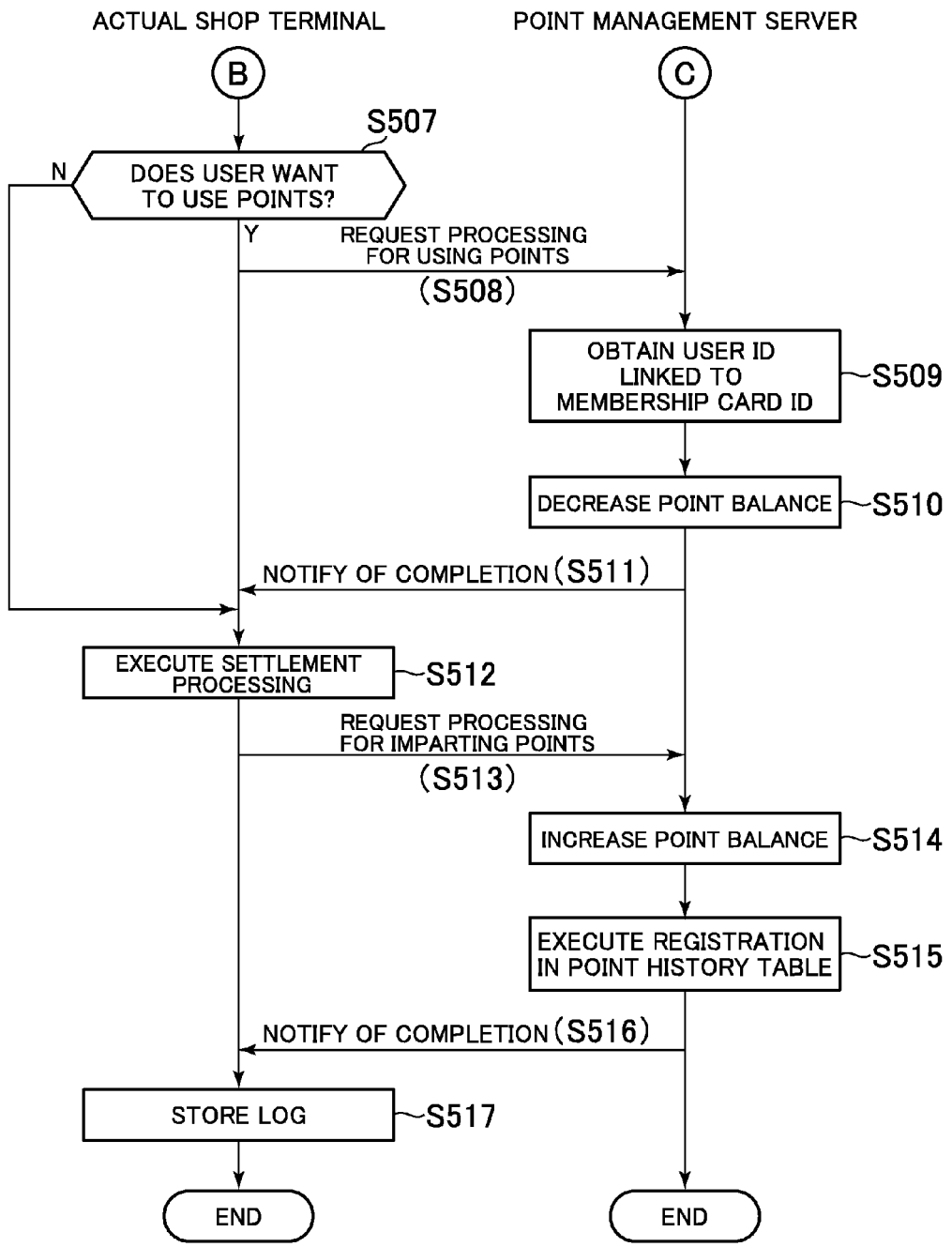
FIG. 22 shows another example of processing executed in the point system.

In the following, processing that is executed when a user presents the point card 40 (a membership card) in buying a product or using a service at the actual shop will be described. FIGS. 21 and 22 show one example of processing that is executed when the bar code 44B of the point card 40 presented by the user is read at the actual shop terminal 3. The control unit 11 of the point management server 10 executes the processing shown in FIGS. 21 and 22 according to a program, thereby functioning as the use request receiving unit 88 and the use permission unit 90.

As shown in FIG. 21, initially, the control unit of the actual shop terminal 3 requests the point management server 10 to check the point balance (S501). In this case, the membership card ID of the point card 40 presented by the user is sent to the point management server 10.

When the above described request is received in the point management server 10, the control unit 11 refers to the membership card table to determine whether or not the validity flag of the membership card ID received from the actual shop terminal 3 indicates "1" (S502). That is, the control unit 11 determines whether or not the membership card presented by the user is valid.

A case in which the validity flag of the membership card ID does not indicate "1" refers to a case in which the membership card presented by the user is not valid and it is thus not possible to use points. In this case, the control unit 11 notifies the actual shop terminal 3 that it is not possible to use points (S506).

Meanwhile, when the validity flag of the membership card ID indicates "1", the control unit 11 determines whether or not the membership card ID received from the actual shop terminal 3 is linked to a user ID (S503). When the membership card ID is linked to the user ID, the control unit 11 obtains the user ID (S504). Then, the control unit 11 obtains the point balance from the user table and the membership card table (S505).

Assume here a case in which the membership card ID received from the actual shop terminal 3 at step S501 is "00001" and the user ID obtained at step S504 is "U0001". In this case, the control unit 11 refers to the membership card table to obtain the point balance of the membership card ID "00001". Further, the control unit 11 refers to the user table to obtain the point balance of the user ID "U0001". Still further, the control unit 11 refers to the membership card table to obtain the point balance of another membership card ID "00101" linked to the user ID "U0001". The control unit 11 obtains the total value of these point balances as the point balance. Then, the control unit 11 notifies the actual shop terminal 3 of the point balance obtained (S506).

Meanwhile, a case in which it is determined at step S503 that the membership card ID is not linked to any user ID refers to a case in which the membership card presented by the user is in a temporary state and it is thus not possible to use points. In this case, the control unit 11 notifies the actual shop terminal 3 that it is impossible to use points (S506).

When the notice from the point management server 10 is received at the actual shop terminal 3, the content of the notice is displayed on the display unit of the actual shop terminal 3. Based on the content displayed, a sales staff of the actual shop asks the user if they want to use points. When the user wants to use points, the sales staff performs an operation for instructing to use points. Note that the operation of instructing to use points cannot be performed when it is not possible to use points.

As shown in FIG. 22, the control unit of the actual shop terminal 3 determines whether or not the user wants to use points (S507). When the user wants to use points, the control unit requests the point management server 10 to execute processing for using points (S508). In this case, information indicating the amount of payment due to the user is sent to the point management server 10 together with the membership card ID of the point card 40 presented by the user.

When the above described request is received in the point management server 10, the control unit 11 refers to the link table to obtain the user ID linked to the membership card ID received from the actual shop terminal 3 (S509). Then, the control unit 11 decreases the point balance as to be described below (S510).

Below, a case is assumed in which payment due to the user is 500 JPY, and the user ID received from the actual shop terminal 3 at step S508 is "00001" and the user ID obtained at step S509 is "U0001".

In this case, initially, the control unit 11 refers to the membership card table to obtain the point balance of the membership card ID "00001". In the example shown in FIG. 13, the point balance of the membership card ID "00001" is 200 points. In this case, as the point balance of the membership card ID "00001" is equal to or less than the payment due to the user (500 JPY), all of the points of the membership card ID "00001" are used for the payment. That is, the point balance of the membership card ID "00001" is updated to 0. Further, in this case, the remaining of the payment due to the user becomes 300 JPY.

Further, the control unit 11 refers to the user table to obtain the point balance of the user ID "U0001". In the example shown in FIG. 10, the point balance of the user ID "U0001" is 100 points. In this case, as the point balance of the user ID "U0001" is equal to or less than the remaining of the payment due to the user (300 JPY), all of the points of the user ID "U0001" are used. That is, the point balance of the user ID "U0001" is updated to 0. Further, in this case, the remaining of the payment due to the user becomes 200 JPY.

Further, the control unit 11 refers to the membership card table to obtain the point balance of another membership card ID "00101" linked to the user ID "U0001". In the example shown in FIG. 13, the point balance of the membership card ID "00101" is 300 points. In this case, as the point balance of the membership card ID "00101" is greater than the remaining of the payment due to the user (200 JPY), the point of the membership card ID "00101" are used by the amount of points corresponding to the amount of payment due to the user (200 JPY). That is, the point balance of the membership card ID "00101" is decreased by 200 points. Further, in this case, the remaining of the payment due to the user becomes 0 JPY.

Note here that although the point of the user ID "U0001" is used prior to the point of the other membership card ID "00101" linked to the user ID "U0001", the point of the membership card ID "00101" may be used prior to the point of the user ID "U0001".

After execution of step S510, the control unit 11 notifies the actual shop terminal 3 of completion of the processing for using points (S511). In this case, the amount of points used and the remaining of the payment due to the user are notified to the actual shop terminal 3. Alternatively, either one of the amount of points used and the remaining of the payment due to the user may be informed to the actual shop terminal 3.

When the above described notice is received at the actual shop terminal 3, the control unit of the actual shop terminal 3 displays the content of the notice on the display unit. The sales staff of the actual shop checks the content, and then performs an operation for settlement processing. The control unit of the actual shop terminal 3 executes the settlement processing according to the operation by the sales staff (S512).

When the settlement processing is completed, the control unit of the actual shop terminal 3 requests the point management server 10 to execute processing for imparting points (S513). In this case, information indicating the amount of points to be imparted to the user and the amount of points used by the user is sent to the point management server 10 together with the membership card ID. Note that the amount of points to be imparted to a user who has used points may be determined based on the original amount of payment or the amount actually paid by the user.

When the above described request is received in the point management server 10, the control unit 11 accesses the membership card table to increase the point balance of the membership card ID received from the actual shop terminal 3 (S514). Specifically, the point balance of the membership card ID received from the actual shop terminal 3 is increased by the amount of points to be imparted to the user. Further, the control unit 11 executes registration in the point history table (S515). Thereafter, the control unit 11 notifies the actual shop terminal 3 of completion of the processing for imparting points (S516). Then, when this notice is received at the actual shop terminal 3, the actual shop terminal 3 stores the content of the notice as a log in the storage unit (S517).

Although it is described in the above that the processing for imparting points is executed immediately after completion of the settlement processing, the processing for imparting points may be collectively executed during, for example, a time band with a fewer processing load (for example, at midnight).

According to the point system 1 according to the first embodiment described above, it is possible to use points earned in the virtual shopping mall (the electronic commerce) at the actual shop. In particular, according to the point system 1, it is possible to use points, that are earned in the virtual shopping mall before completion of registration of the point card 40, at the actual shop.

Further, according to the point system 1, it is possible to use points earned at an actual shop in the virtual shopping mall (the electronic commerce). Further, according to the point system 1, it is possible to use points earned at an actual shop at another actual shop.

The point system 1 according to the first embodiment includes function blocks other than those shown in FIG. 16. For example, the point system 1 includes the function blocks shown in FIG. 23. That is, the point system 1 includes a use restriction request receiving unit 92 and a use restriction unit 94.

The use restriction request receiving unit 92 receives a use restriction request with a designation of a membership card ID. When the use restriction request with a designation of a membership card ID is received, the use restriction unit 94 restricts use of the membership card identified by the membership card ID.

For example, when the link button 66 correlated to the membership card ID "00001" is clicked on the list screen 60, a request for changing the validity flag is sent together with the membership card ID "00001" from the user terminal 4 to the point management server 10. The use restriction request receiving unit 92 receives the above described request. When this request is received, the use restriction unit 94 changes the validity flag of the membership card ID "00001".

That is, when the validity flag of the membership card ID "00001" indicates "1", the use restriction unit 94 changes the validity flag of the membership card ID "00001" to "0". In this case, the membership card with the membership card ID "00001" becomes invalid. Note that when the validity flag of the membership card ID "00001" indicates "0", the use restriction unit 94 changes the validity flag of the membership card ID "00001" to "1". In this case, the membership card with the membership card ID "00001" becomes valid.

In the following, processing that is executed in the point system 1 to implement the use restriction request receiving unit 92 and the use restriction unit 94 will be described. FIG.

Figure 24:
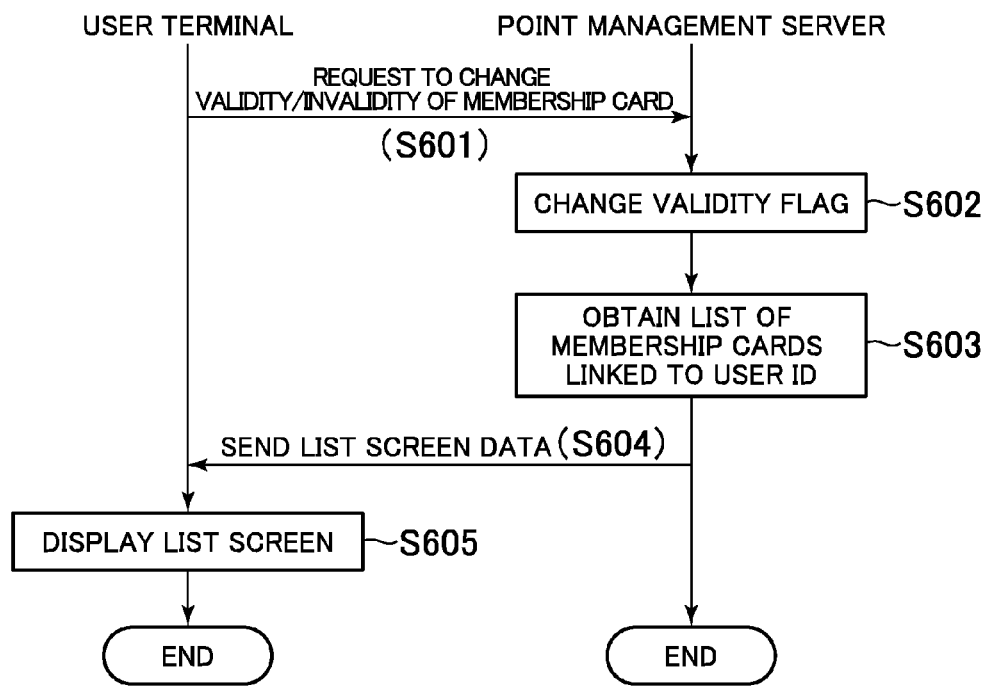
FIG. 24 shows another example of processing executed in the point system.

24 shows one example of processing that is executed when the link button 66 on the list screen 60 is clicked. The control unit 11 of the point management server 10 executes the processing shown in FIG. according to a program, thereby functioning as the use restriction request receiving unit 92 and the use restriction unit 94. In the following, the processing shown in FIG. 24 is described based on an assumption that the link button 66 correlated to the membership card ID "00001" is clicked.

When the link button 66 correlated to the membership card ID "00001" is clicked, the control unit of the user terminal 4 requests the point management server 10 to change the validity/invalidity of the membership card with the membership card ID "00001" (S601).

When the above described request is received in the point management server 10, the control unit 11 changes the validity flag of the membership card ID "00001" (S602). When the validity flag of the membership card ID "00001" indicates "1", the control unit 11 updates the validity flag to "0", and when the validity flag of the membership card ID "00001" indicates "0", the control unit 11 updates the validity flag to "1".

Steps S603 to S605, to be executed thereafter, are similar to steps S203 to S205 in FIG. 7, and therefore not explained here.

According to the point system 1, management of the membership card with link to the user ID allows a user to desirably change the validity/invalidity of the membership card.

Note that the use restriction request receiving unit 92 and the use restriction unit 94 are not indispensable structural elements of the point system 1, and may be omitted. When the use restriction unit 94 is omitted, step S502 in the processing shown in FIG. 21, for example, may be omitted.

Second Embodiment

A second embodiment of the present invention will be described. An overall structure of a point system 1 according to the second embodiment of the present invention is similar to that in the first embodiment (see FIG. 1).

In the point system 1 according to the second embodiment, when a membership card used at an actual shop is linked to a user ID used in the virtual shopping mall through the procedure at step S103 in FIG. 3, the point balance of the membership card is integrated into the point balance of the user ID used in the virtual shopping mall. Specifically, in the point system 1 according to the second embodiment, the points earned at the actual shop are added to the points earned in the virtual shopping mall, and the resultant point balance is stored in the "point balance" field of the user table. In this regard, the point system 1 according to the second embodiment differs from that in the first embodiment.

FIGS. 25 and 26 show one example of change in the membership card table and the user table when the membership card IDs "00001" and "00101" are linked to the user ID "U0001". Note that, for brevity of description, fields other than the "membership card ID", "validity flag", "link flag", and "point balance" fields are not shown in FIG. 25, and fields other than the "user ID" and "point balance" fields are not shown in FIG. 26.

When the membership card IDs "00001" and "00101" are linked to the user ID "U0001", the validity flags and the link flags of the membership card IDs "00001" and "00101" are updated from "0" to "1", as shown in FIG. 25. This is similar to the first embodiment.

When the above described link is made, the point balances of the membership card IDs "00001" and "00101" are integrated into that of the user ID "U0001". That is, the points earned by the user at actual shops are integrated into the points earned by the user in the virtual shopping mall.

That is, as shown in FIGS. 25 and 26, the point balance (200) of the membership card ID "00001" and the point balance (300) of the membership card ID "00101" are added to the point balance (100) of the user ID "U0001", whereby the point balance of the user ID "U0001" is updated to "600". In the above, the point balances of the membership card IDs "00001" and "00101" are updated to "0".

In imparting thereafter points to the membership card ID "00001" or "00101", the point is added to the point balance of the user ID "U0001". That is, points earned at the actual shop is added to the point balance of the user ID "U0001".

In the following, processing that is executed in the point system 1 according to the second embodiment will be described. Initially, one example of processing that is executed when the log-in button 56 on the log-in screen 50 is clicked will be described.

When the log-in button 56 is clicked, the processing shown in FIG. 17 is initially executed, similar to the first embodiment. However, in the point system. 1 according to the second embodiment, the processing shown in FIG. 27 is executed instead of the processing shown in FIG. 18, when the new registration button 62 on the list screen 60 is clicked.

Figure 27:
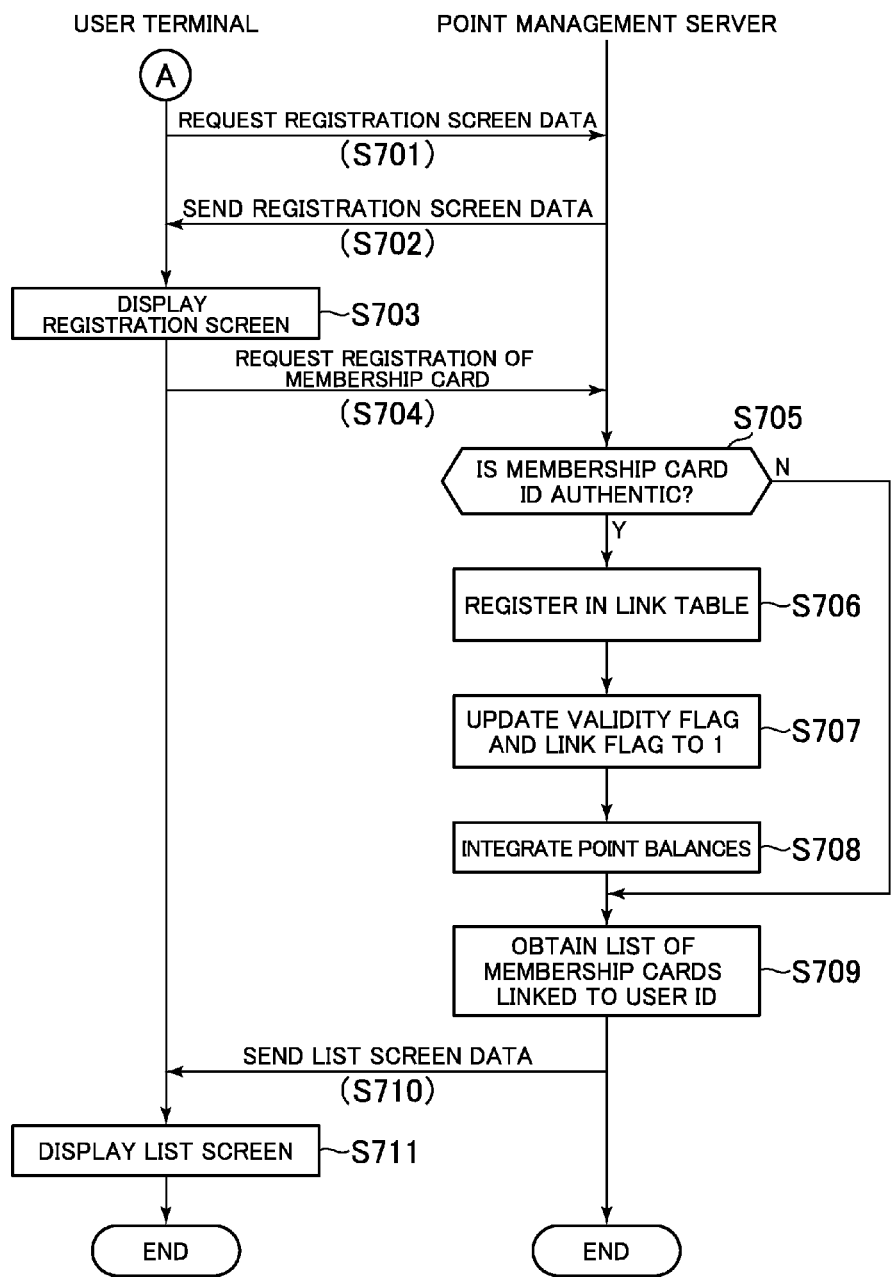
FIG. 27 shows another example of processing executed in the point system.

Steps S701 to S707 in FIG. 27 are similar to steps S208 to S214 in FIG. 18 and thus not described here.

At step S708, the control unit 11 integrates the point balance of the membership card ID received from the user terminal 4 at step S704 (that is, the membership card ID inputted in the input space 72 on the registration screen 70) into the point balance of the user ID inputted in the input space 52 on the log-in screen 50.

Assume here a case in which the user ID inputted in the input space 52 on the log-in screen 50 is "U0001" and the membership card ID inputted in the input space 72 on the registration screen 70 is "00001". In this case, the control unit 11 integrates the point balance of the membership card ID "00001" into the point balance of the user ID "U0001". That is, the control unit 11 refers to the membership card table to obtain the point balance of the membership card ID "00001". Thereafter, the control unit 11 accesses the user table to add the point balance obtained as described above to the point balance of the user ID "U0001". Further, the control unit 11 accesses the membership card table to update the point balance of the membership card ID "00001" to "0".

Steps S709 to S711 are similar to steps S215 to S217 in FIG. 18, and thus not described here.

Figure 28:
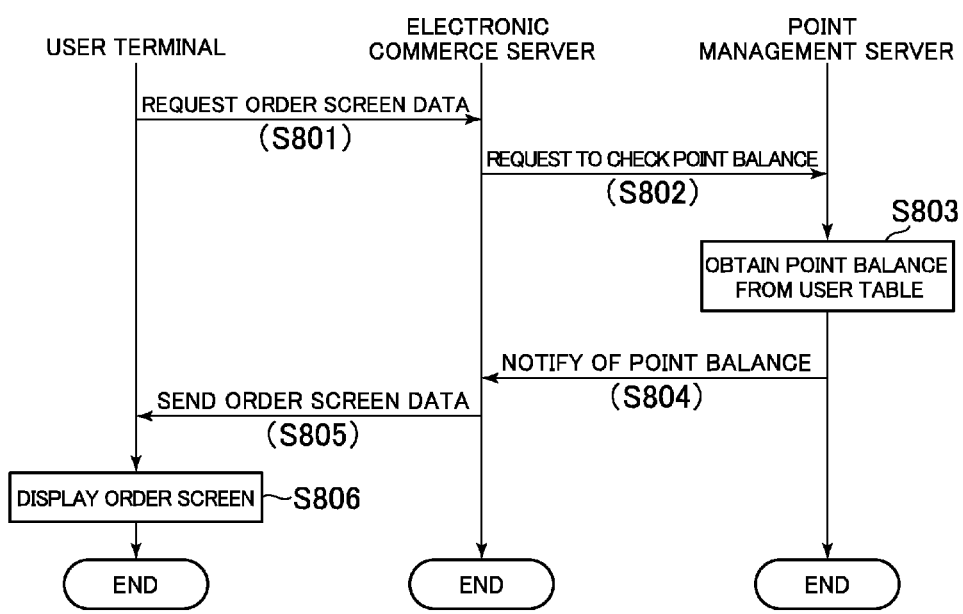
FIG. 28 shows another example of processing executed in the point system.

In the following, processing that is executed when a user buys a product in the virtual shopping mall will be described. FIG. 28 shows one example of processing for displaying the order screen 30 on the display unit of the user terminal 4. In the point system 1 according to the second embodiment, the processing shown in FIG. 28 is executed instead of the processing shown in FIG. 19.

Steps S801 and S802 in FIG. 28 are similar to steps S301 and S302 in FIG. 19, and thus not described here.

At step S803, the control unit 11 obtains the point balance from the user table. For example, in the case where the user ID of a user who buys a product is "U0001", the control unit 11 refers to the user table to obtain the point balance of the user ID "U0001". In the point system 1 according to the second embodiment, as the point balances of the membership card IDs "00001" and "00101", which are linked to the user ID "U0001", are integrated into the point balance of the user ID "U0001", the control unit 11 does not need to refer to the membership card table, different from the first embodiment (see step 305).

Steps S804 to S806 are similar to steps S307 to S309 in FIG. 19, and thus not described here.

Figure 29:
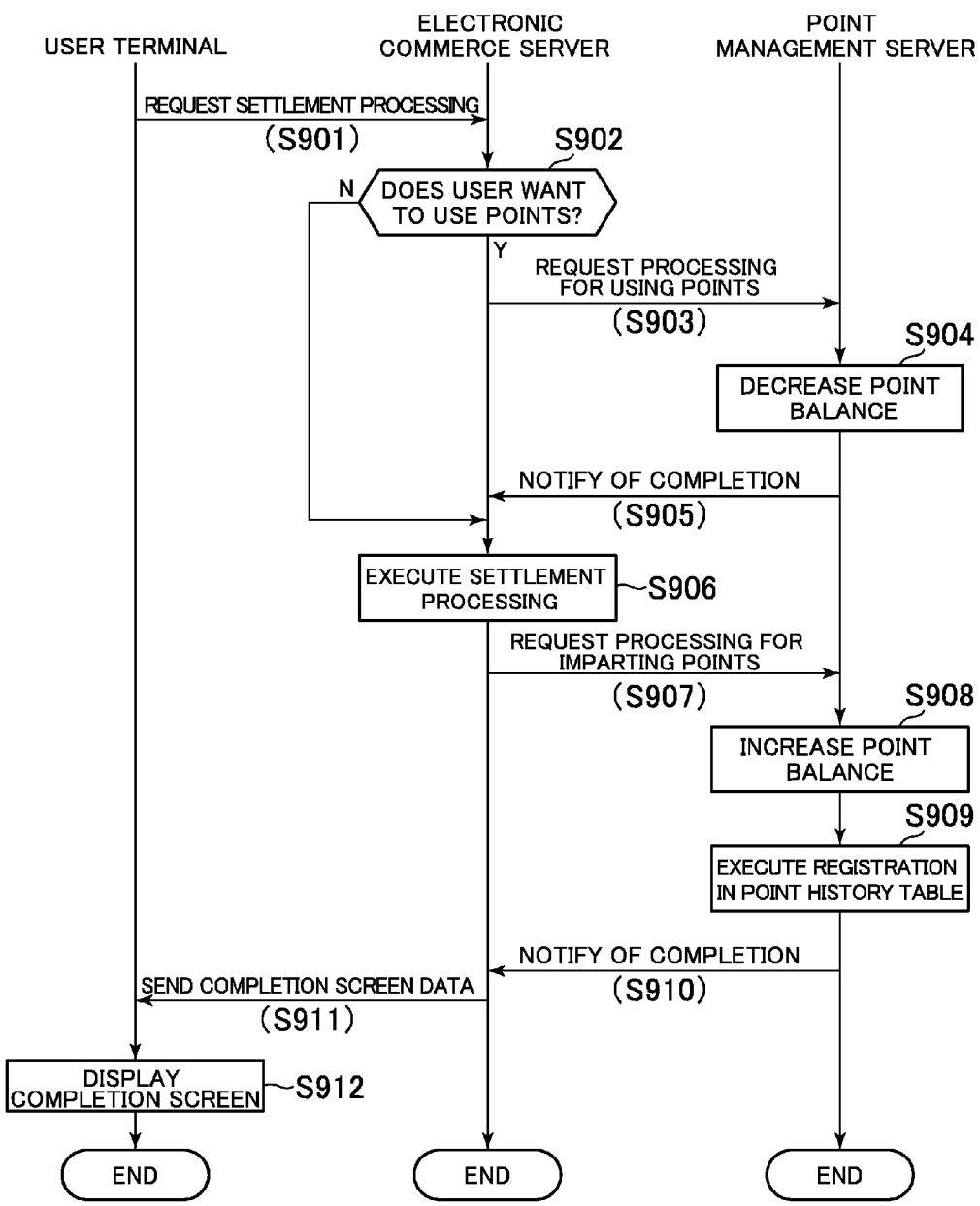
FIG. 29 shows another example of processing executed in the point system.

FIG. 29 shows one example of processing that is executed when the order button 34 on the order screen 30 is clicked. In the point system 1 according to the second embodiment, the processing shown in FIG. 29 is executed instead of the processing shown in FIG. 20.

Steps S901 to 903 in FIG. 29 are similar to steps S401 to S403 in FIG. 20, and thus not described here.

At step S904, the control unit 11 decreases the point balance as to be described below. The processing executed at step S904 will be described based on an assumption that the payment due to the user is 500 JPY and the user ID received from the electronic commerce server 20 at step S903 is "U0001".

In this case, initially, the control unit 11 refers to the user table to obtain the point balance of the user ID "U0001". In the example shown in FIG. 26, the point balance of the user ID "U0001" is 600 points. In this case, as the point balance of the user ID "U0001" is greater than the payment due to the user (500 JPY), the amount of points corresponding to the payment due to the user is deducted from the point balance of the user ID "U0001". That is, the point balance of the user ID "U0001" is updated to 100 points. Further, in this case, the remaining of the payment due to the user becomes 0 JPY.

If the point balance of the user ID "U0001" is equal to or less than the payment due to the user, all of the points of the user ID "U0001" are used. That is, the point balance of the user ID "U0001" is updated to 0 point. Further, in this case, a price obtained by deducting the points used from the original amount of payment makes the remaining of the payment due to the user.

Steps S905 to S912 are similar to steps S408 to S415 in FIG. 20, and therefore not described here.

Figure 30:
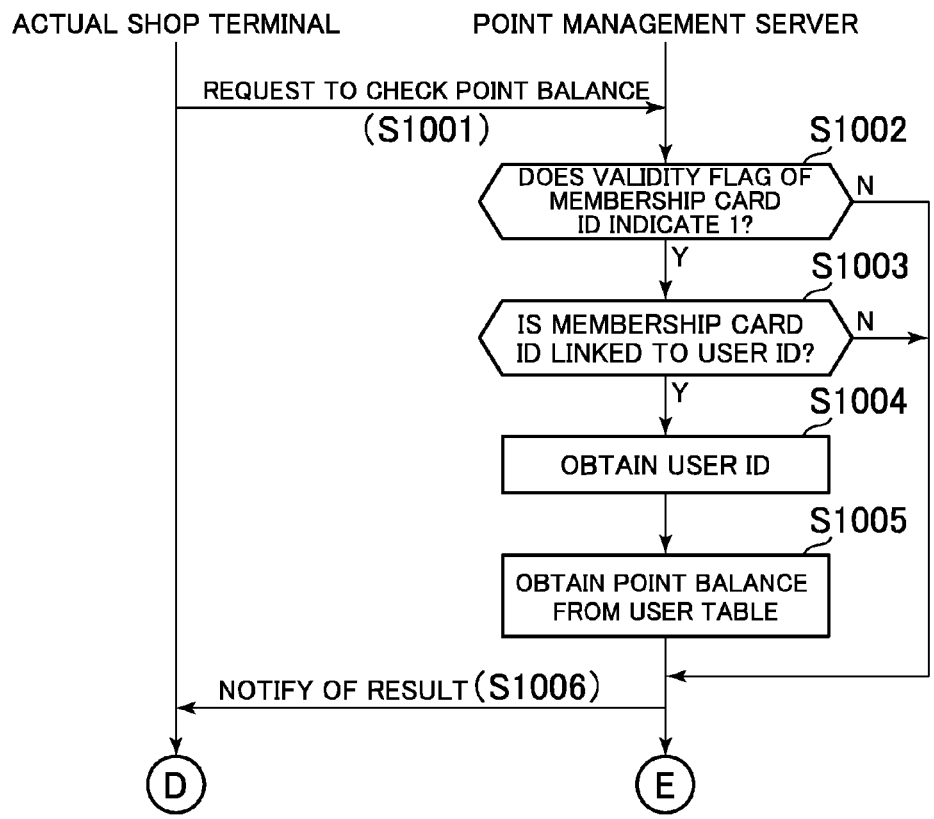
FIG. 30 shows another example of processing executed in the point system.
Figure 31:
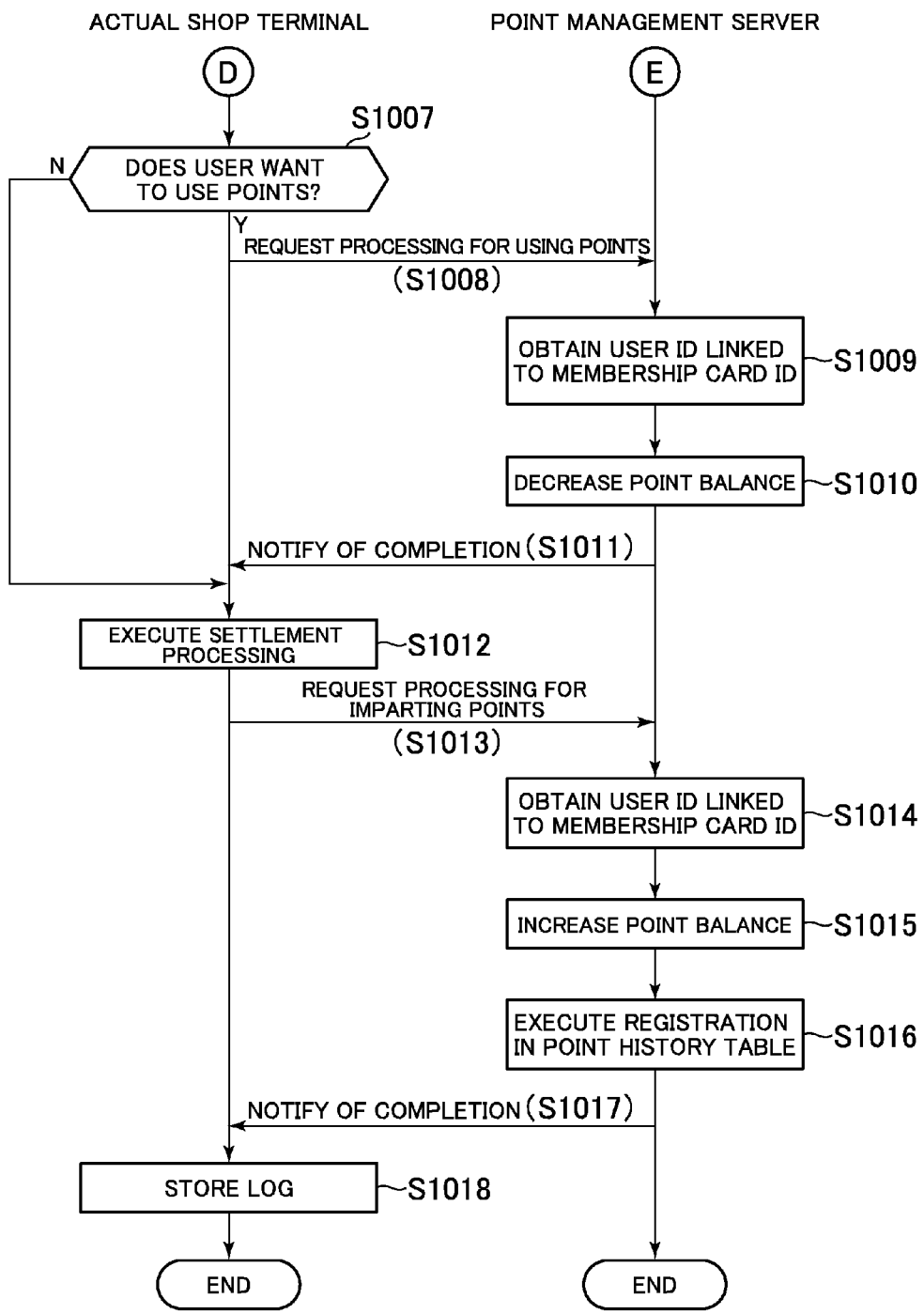
FIG. 31 shows another example of processing executed in the point system.

In the following, processing that is executed when a user presents the point card 40 (the membership card) in buying a product or using a service at the actual shop will be described. FIGS. 30 and 31 show one example of processing that is executed when the bar code 44B of the point card 40 presented by the user is read at the actual shop terminal 3. In the point system 1 according to the second embodiment, the processing shown in FIGS. 30 and 31 is executed instead of the processing shown in FIGS. 21 and 22.

Steps S1001 to S1004 and S1006 in FIG. 30 are similar to S501 to S504 and S506 in FIG. 21, and therefore not described here.

At step S1005, the control unit 11 refers to the user table to obtain the point balance of the user ID obtained at step S1004.

Steps S1007 to S1013 in FIG. 31 are similar to steps S507 to S513 in FIG. 22, and thus not described here.

When the above described request is received in the point management server 10 at step S1013, the control unit 11 refers to the link table to obtain the user ID linked to the membership card ID received from the actual shop terminal 3 (S1014). Then, the control unit 11 accesses the user table to increase the point balance of the user ID obtained at step S1014 (S1015). That is, the point balance of the user ID obtained at step S1014 is increased by the amount of points to be imparted to the user.

Steps S1016 to S1018 in FIG. 31 are similar to steps S515 to S517 in FIG. 22, and thus not described here.

Although it is described in the above that the processing for imparting points is executed immediately after completion of the settlement processing, the processing for imparting points may be collectively executed during, for example, a time band with a fewer processing load (for example, at midnight).

According to the point system 1 according to the second embodiment as well, it is possible to use points earned in the virtual shopping mall (the electronic commerce) at the actual shop, similar to the first embodiment. Further, it is possible to use points, which are earned in the virtual shopping mall before completion of registration of the point card 40, at the actual shop.

According to the point system 1 according to the second embodiment, it is possible to use points earned at the actual shop in the virtual shopping mall (the electronic commerce transaction), similar to the first embodiment. Further, it is possible to use points earned at an actual shop at another actual shop.

Third Embodiment

A third embodiment of the present invention will be described. An overall structure of a point system 1 according to the third embodiment of the present invention is similar to that in the first embodiment (see FIG. 1).

The point system 1 according to the third embodiment differs from that in the first embodiment in which the number of membership cards that can be linked to a single user is limited to a number equal to or less than a predetermined upper limit number.

Figure 32:
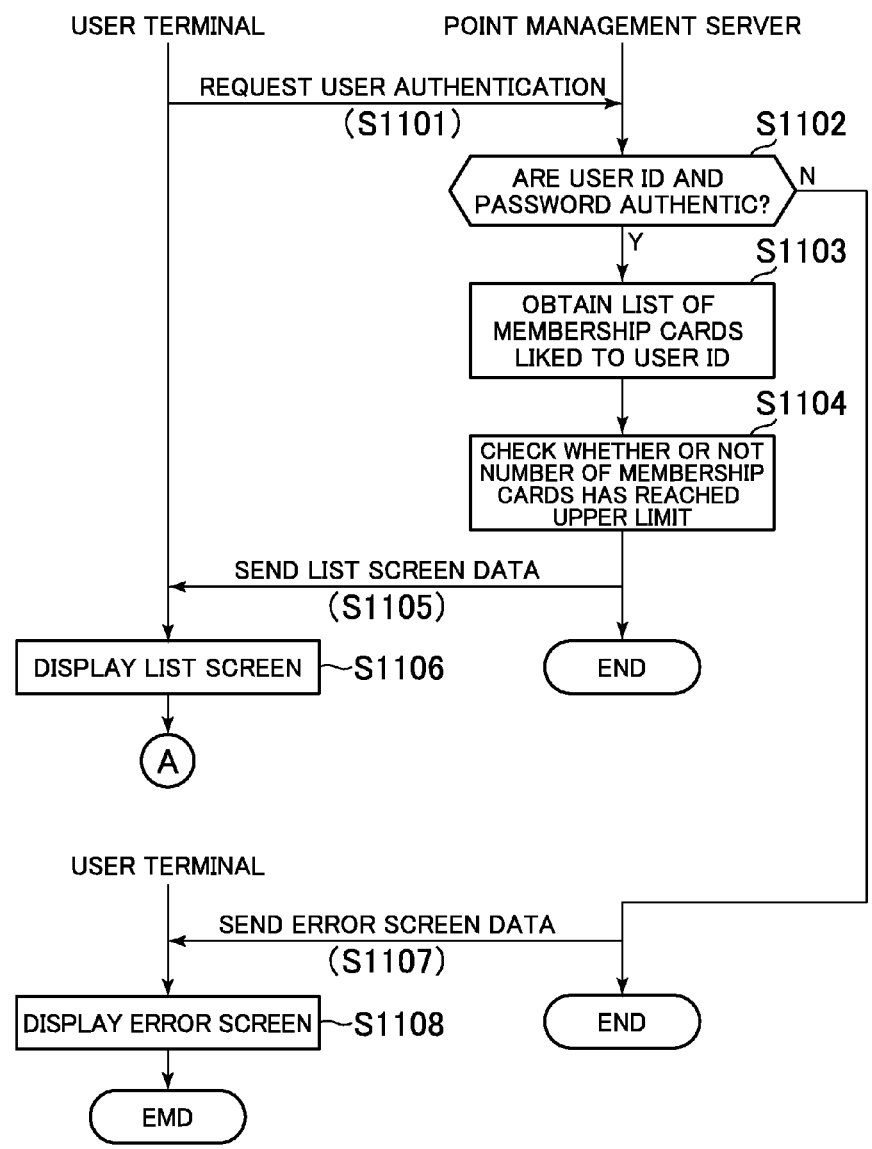
FIG. 32 shows another example of processing executed in the point system.

Processing that is executed in the point system 1 according to the third embodiment will be described. FIG. 32 explains processing that is executed when the log-in button 56 on the log-in screen 50 is clicked. In the point system 1 according to the third embodiment, the processing shown in FIG. 32 is executed instead of the processing shown in FIG. 17.

Steps S1101 to S1103 in FIG. 32 are similar to steps S201 to S203 in FIG. 17, and are thus not described here.

At step S1104, the control unit 11 determines whether or not the number of membership cards linked to the user ID received from the user terminal 4 has reached the upper limit number. When the number of membership cards linked to the user ID has reached the upper limit number, the control unit 11 sends data on a list screen 60 in which new registration of a membership card is restricted (prohibited) to the user terminal 4 at step S1105.

Figures 33, 34:
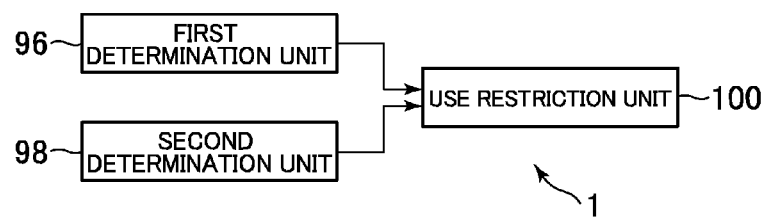
FIG. 33 shows another example of the list screen.
FIG. 34 is a function block diagram of the point system.

FIG. 33 shows one example of the list screen 60 in which new registration of a membership card is restricted. Specifically, FIG. 33 shows a case in which the upper limit number of membership cards which can be linked to a single user ID is "3". The new registration button 62 is not displayed on the list screen 60 shown in FIG. 33, and a message 68 to the effect that the number of membership cards has reached the upper limit number is displayed instead. Alternatively, the new registration button 62 may be displayed in an invalid state (that is, a state not accepting a click) rather than being not displayed.

Steps S1105 to S1108 in FIG. 32 are similar to steps S204 to S207 in FIG. 17, and thus not described here.

According to the point system 1 according to the third embodiment, it is possible to restrict the number of membership cards which can be linked to a single user ID. That is, according to the point system 1 according to the third embodiment, it is possible to prevent a situation in which an excessively large number of membership cards are linked to a single user ID.

Fourth Embodiment

A fourth embodiment of the present invention will be described. An overall structure of a point system 1 according to the fourth embodiment of the present invention 1 is similar to that in the first embodiment (see FIG.

The point system 1 according to the fourth embodiment differs from that in the first embodiment in that the former includes a structure for preventing unauthorized use of a membership card. That is, the point system 1 according to the fourth embodiment includes the function blocks shown in FIG. 34 in addition to those shown in FIG. 16 (and FIG. 23). That is, the point system 1 according to the fourth embodiment includes a first determination unit 96, a second determination unit 98, and a use restriction unit 100.

In the case where a first membership card ID and a second membership card ID are linked to a single user ID, the first determination unit 96 determines whether or not the location of a first actual shop at which the first membership card identified by the first membership card ID has been used is far away from the location of a second actual shop at which the second membership card identified by the second membership card ID has been used. That is, the first determination unit 96 determines, based on a predetermined determination criterion, whether or not the difference in location between the first actual shop and the second actual shop is large.

Note here that the above mentioned "determination criterion" refers to a determination criterion for determining whether or not the difference in location between the first actual shop and the second actual shop is large.

For example, the above mentioned "determination criterion" may be "whether or not the distance between the location of the first actual shop and that of the second actual shop is longer than a reference distance". In this case, it is necessary to have information necessary to calculate the distance between actual shops registered in the actual shop table. For example, it is necessary to have the latitude and the longitude of the location of each actual shop registered in the actual shop table.

Further, for example, the above mentioned "determination criterion" may be "whether or not the administrative district of the location of the first actual shop differs from that of the second actual shop". For example, an "administrative district" corresponds to "prefecture" in Japan, "state or county" in the U.S., "province or region" in China, "special city, metropolitan city, or province" in Korea. In the case of Japan, for example, the above mentioned "determination criterion" may be "whether or not the prefecture of the location of the first actual shop differs from that of the second actual shop". Alternatively, an "administrative district" may refer to an administrative district subordinate to the administrative district mentioned above as examples. In the case of Japan, for example, the above mentioned "determination criterion" may be "whether or not the city, town, or village of the location of the first actual shop differs from that of the second actual shop".

Further, for example, the above mentioned "determination criterion" may be "whether or not a predetermined part (or the whole) of the postcode of the location of the first actual shop differs from a predetermined part (or the whole) of the postcode of the location of the second actual shop". For example, in the case where a number that is a combination of an n-digit number (n: an integer of one or greater) identifying a region and an m-digit number (m: an integer of one or greater) identifying additional information (a post office in charge of collection and delivery, or the like) is used as a postcode, the above mentioned "determination criterion" may be "whether or not the first n-digit number of the postcode of the location of the first actual shop differ from the first n-digit number of the postcode of the location of the second actual shop". In the case of Japan, for example, as a seven-digit number obtained by combining a three-digit number identifying a region with a four-digit number identifying a post office in charge of collection and delivery is used as a postcode, the above mentioned "determination criterion" may be "whether or not the first three-digits of the postcode of the location of the first actual shop differ from the first three-digits of the postcode of the location of the second actual shop". Alternatively, in the case where a number including only an n-digit number (n: one or more integer) identifying a region is used as a postcode, the above mentioned "determination criterion" may be "whether or not the postcode of the location of the first actual shop differs from the postcode of the location of the second actual shop".

Further, for example, in the case where a telephone number includes a number identifying a region, the above mentioned "determination criterion" may be "whether or not the regional number of the telephone number of the location of the first actual shop differs from the regional number of the telephone number of the location of the second actual shop". For example, as the telephone number of a fixed telephone in Japan includes an area code identifying an area, the above mentioned "determination criterion" may be "whether or not the area code of the telephone number of the location of the first actual shop differs from the area code of the telephone number of the location of the second actual shop".

Further, for example, a combination of administrative districts (in the case of Japan, for example, prefecture, city, town, village, or the like) that are considered far away from each other may be defined in advance. Then, the above mentioned "determination criterion" may be "whether or not the combination of the administrative district (in the case of Japan, for example, prefecture, city, town, village, or the like) of the location of the first actual shop and the administrative district (in the case of Japan, for example, prefecture, city, town, village, or the like) of the location of the second actual shop coincide with any of the above described predetermined combinations".

Further, for example, a combination of postcodes (or telephone numbers or the like) that are considered far away from each other may be defined in advance. Then, the above mentioned "determination criterion" may be "whether or not the combination of the postcode (or a telephone number or the like) of the location of the first actual shop and the postcode (or telephone numbers or the like) of the location of the second actual shop coincides with any of the above described predetermined combinations".

In the case where a first membership card ID and a second membership card ID are linked to a single user ID, the second determination unit 98 determines whether or not the time and date (a first time and date) at which the first membership card identified by the first membership card ID is used at the first actual shop is close to the time and date (a second time and date) at which the second membership card identified by the second membership card ID is used at the second actual shop. That is, the second determination unit 98 determines, based on a predetermined determination criterion, whether or not the difference between the first time and date and the second time and date is small.

Note here that the above mentioned "determination criterion" is a determination criterion for determining whether or not the difference between the first time and date and the second time and date is small.

For example, the above mentioned "determination criterion" may be "whether or not the difference in time between the first time and date and the second time and date is smaller than a reference period of time". Alternatively, the above mentioned "determination criterion" may be "whether or not the first time and date and the second time and date belong to the same day".

The use restriction unit 100 restricts use of at least one of the first and second membership cards based on the result of determination by the first determination unit 96 and the result of determination by the second determination unit 98.

For example, when the difference in the location between the first actual shop and the second actual shop is large, and the difference between the first time and date and the second time and date is small, the use restriction unit 100 restricts use of at least one of the first and second membership cards. That is, in the case where the location of the first actual shop is far away from the location of the second actual shop and the first time and date is close to the second time and date, the use restriction unit 100 restricts use of at least one of the first and second membership cards.

Note that "to restrict use of a membership card" means, for example, to prohibit use of points. Alternatively, "to restrict use of a membership card" means to prohibit both use and earning of points. For example, the use restriction unit 100 changes the validity flag of the membership card to "0" to thereby restrict use of the membership card.

A case in which the location of the first actual shop is far away from the location of the second actual shop and the first time and date is close to the second time and date corresponds to a case in which the first and second membership cards linked to a single user ID have been used by two or more persons. In this case, it is highly likely that at least one of the users has used the membership card for fraud. Regarding this point, according to the point system 1 according to the fourth embodiment, as the first and second membership cards are invalidated in such a case, it is possible to prevent unauthorized use of the first and second membership cards.

Note that according to the point system 1 according to the fourth embodiment, in the case where membership cards for use by two or more users are linked to a single user ID, use of these membership cards is restricted. Therefore, according to the point system 1 according to the fourth embodiment, in the case where, for example, there is a rule defining that a membership card for use by only a single user can be linked to a single user ID, it is possible to prevent use of a membership card that violates such a rule.

A function for preventing unauthorized use of a membership card such as is described above is useful also in a point system that does not include a function for common use of points between a virtual shopping mall (an electronic commerce) and an actual shop or a function for common use of points between a plurality of actual shops (see the sixth embodiment to be described later).

Fifth Embodiment

A fifth embodiment of the present invention will be described. An overall structure of a point system 1 according to the fifth embodiment of the present invention is similar to that in the first embodiment (see FIG. 1).

The point system 1 according to the fifth embodiment differs from that in the first embodiment and the second embodiment in that the former includes a structure for leading a user of the virtual shopping mall (the electronic commerce) to the actual shop.

In the point system 1 according to the fifth embodiment, when a web page provided by the point management server 10 is accessed from the user terminal 4, a campaign screen 110 such as is shown in FIG. 35, for example, is displayed.

The campaign screen 110 includes a list 112 of actual shops that are conducting or scheduled to conduct a campaign. An actual shop conducting the campaign, content of the campaign, a campaign period, or the like are shown in the list 112.

In the list 112, a link button 114 for participating in a campaign conducted at an actual shop is shown in association with the actual shop. A user who wants to participate in the campaign clicks the link button 114. When the link button 114 is clicked, the user's intention of participating in the campaign is notified to the point management server 10, and registered in the point system 1.

When a user having participated in the campaign buys a product at an actual shop conducting the campaign, more points are imparted to the user than those to be imparted to a user having not participated in the campaign. For example, a bonus point is imparted in addition to basic points. In this manner, it is possible to lead a user of the virtual shopping mall (the electronic commerce) to the actual shop to do shopping.

In the following, a structure for implementing the above will be described. Initially, data stored in the database 15 will be described.

FIG. 36 shows one example of a campaign table. A campaign table shows a list of campaigns. The campaign table shown in FIG. 36 includes "campaign ID", "actual shop ID", "content", and "period" fields. In the "campaign ID" field, identification information for uniquely identifying a campaign is registered. In the "actual shop ID" field, the actual shop ID of a shop conducting the campaign is registered. In the "content" field, content of the campaign is registered. In the "period" field, a campaign period is registered.

FIG. 37 shows one example of a participation situation table. The participation situation table is a table showing a participation situation of a user for a campaign. The participation situation table shown in FIG. 37 includes "user ID" and "campaign ID" fields. In the "user ID" field, the user ID of a user having participated in the campaign is registered. In the "campaign ID" field, the campaign ID of a campaign in which the user has participated is registered.

Figure 23:
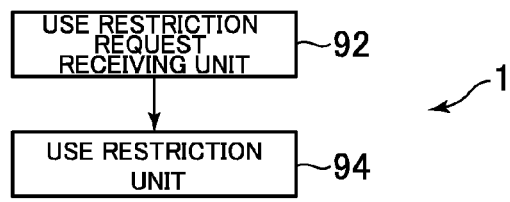
FIG. 23 is a function block diagram of the point system.
Figure 38:
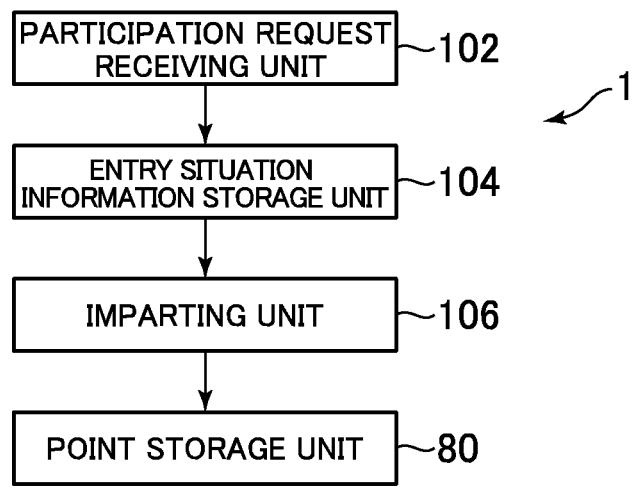
FIG. 38 is a function block diagram of the point system.

The point system 1 according to the fifth embodiment includes function blocks shown in FIG. 38 in addition to those shown in FIG. 16 (and FIG. 23). That is, the point system 1 according to the fifth embodiment includes a participation request receiving unit 102, a participation situation information storage unit 104, and an imparting unit 106.

For example, the participation situation information storage unit 104 is implemented using the database 15. The participation request receiving unit 102 and the imparting unit 106 are implemented by the control unit 11 of the point management server 10. That is, the control unit 11 of the point management server 10 executes processing according to a program, thereby functioning as the participation request receiving unit 102 and the imparting unit 106.

The participation request receiving unit 102 receives a request from a user for participating in a campaign conducted by an actual shop. In the point system 1 according to the fifth embodiment, when the link button 114 on the campaign screen 110 is clicked, a request for participating in a campaign is sent to the point management server 10. In this case, the user ID of a user who wants to participate in the campaign as well is sent to the point management server 10. The participation request receiving unit 102 receives the above described participation request.

The participation situation information storage unit 104 stores the participation situation information in association with a user ID. The participation situation information is information indicating whether or not a participation request has been received from the user identified by the user ID. For example, the participation situation information storage unit 104 stores the participation situation table such as is shown in FIG. 37.

The imparting unit 106 increases or decreases the amount of points to be imparted to a user who presents a membership card at an actual shop in buying or using a product or a service, based on the participation situation information stored in association with the user ID linked to the membership card ID of the membership card.

For example, when the user has not participated in the campaign conducted by the actual shop, the imparting unit 106 imparts points to be normally imparted to the user. Meanwhile, when the user has participated in the campaign conducted by the actual shop, the imparting unit 106 imparts more points to the user than those to be normally imparted.

Alternatively, when the user has participated in the campaign conducted by the actual shop, the imparting unit 106 may impart points to be normally imparted to the user. Meanwhile, when the user has not participated in the campaign conducted by the actual shop, the imparting unit 106 may impart fewer points to the user than those to be normally imparted.

To outline, when the user has participated in the campaign conducted at the actual shop, the imparting unit 106 imparts more points to the user than those to be imparted to the user when the user have not participated in the campaign.

According to the point system 1 according to the fifth embodiment described above, it is possible to lead a user of the virtual shopping mall (the electronic commerce transaction) to the actual shop to do shopping.

Below, modified examples of the above described first to fifth embodiments will be described.

[1] For example, two or more of the third to fifth embodiments may be combined.

[2] For example, as described above, a program (a membership card program) for causing a portable terminal (for example, a portable phone) to function as a membership card may be installed in the portable terminal, and the portable terminal may be used at the actual shop instead of the point card 40.

Below, the procedure at step S102, S103 in FIG. 3 to be performed when the above mentioned portable terminal is used as the membership card will be described.

In the case where the above described portable terminal is used as the membership card, a user accesses from the portable terminal a server that provides a membership card program to download the membership card program to the portable terminal. Then, the user activates the membership card program downloaded in the portable terminal.

At initial activation of the membership card program, a log-in screen is displayed. The log-in screen is similar to that shown in FIG. 6. When it is determined that the combination of the user ID and the password inputted on the log-in screen is authentic, a membership card ID is newly issued to the portable terminal. Further, in this case, the combination of the user ID inputted on the log-in screen and the membership card ID newly issued is registered in the link table. Still further, the newly issued membership card ID is registered also in the membership card table. In this case, the validity flag and the link flag are set to "1" from the beginning. After completion of the above, a membership card screen 120, such as is shown in FIG. 39, for example, is displayed on the display unit of the portable terminal.

Figure 39:
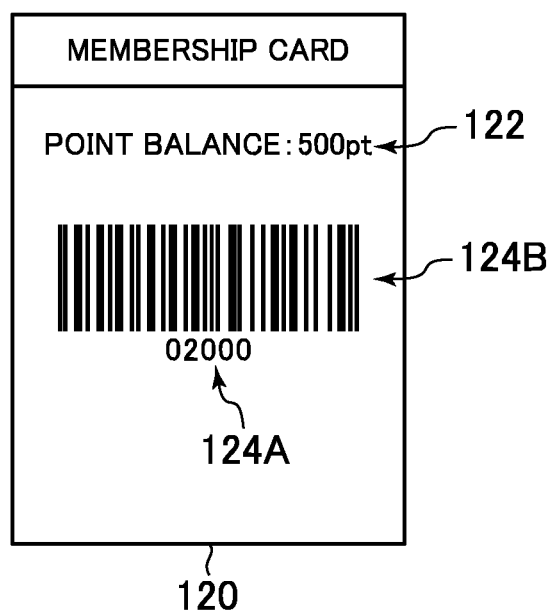
FIG. 39 shows one example of the membership card screen.

A point balance 122 is displayed on the membership card screen 120 shown in FIG. 39. Further, a membership card ID 124A and a bar code 124B are displayed on the membership card screen 120. The membership card ID 124A is a newly issued membership card ID, and the bar code 124B is a bar code indicating the membership card ID 124A.

In buying a product or using a service at the actual shop, a user presents the membership card screen 120. In this case, the bar code 124B on the membership card screen 120 is read by the actual shop terminal 3, and then points are imparted or used.

[3] For example, in a state in which no membership card is linked to the user ID (that is, before completion of the procedure at step S103 in FIG. 3), the points earned by the user in the electronic commerce transaction may not be used.

For example, in the processing shown in FIG. 19, when it is determined at step S303 that no membership card is linked to the user ID, the control unit 11 may notify the electronic commerce server 20 that it is not possible to use points. In this case, a message informing or an image expressing that it is not possible to use points may be displayed on the order screen. Further, in this case, a message or an image for encouraging the user to perform the procedure at step S103 may be displayed on the order screen.

Alternatively, in the processing shown in FIG. 20, when it is determined at step S404 that no membership card is linked to the user ID, the control unit 11 may notify the electronic commerce server 20 that it is not possible to use points. In this manner, it may be arranged such that the points imparted through the electronic commerce cannot be used when no membership card is linked to the user ID (that is, the procedure at step S103 in FIG. 3 is not yet completed) even though the user wants to use the points.

[4] For example, after completion of the procedure at step S102 in FIG. 3 and before completion of the procedure at step S103, when the user presents the point card 40 in buying a product or using a service at the actual shop, the actual shop terminal 3 may print a message on a receipt for encouraging the user to perform the procedure at step S103.

That is, when the user presents the point card 40 in buying a product or using a service at an actual shop, the actual shop terminal 3 may request the point management server 10 to check whether or not the point card 40 is linked to a user ID used in the virtual shopping mall. Then, based on the reply from the point management server 10, the actual shop terminal 3 may print the above mentioned message on the receipt. Note that the actual shop terminal 3 may print the above mentioned message on a sheet of paper other than the receipt.

[5] For example, when the user completes the procedure at step S103, points may be imparted to the user as privilege. Alternatively, the above mentioned privilege may be imparted to the user only when a first membership card is linked to the user ID.

Sixth Embodiment

Figure 40:
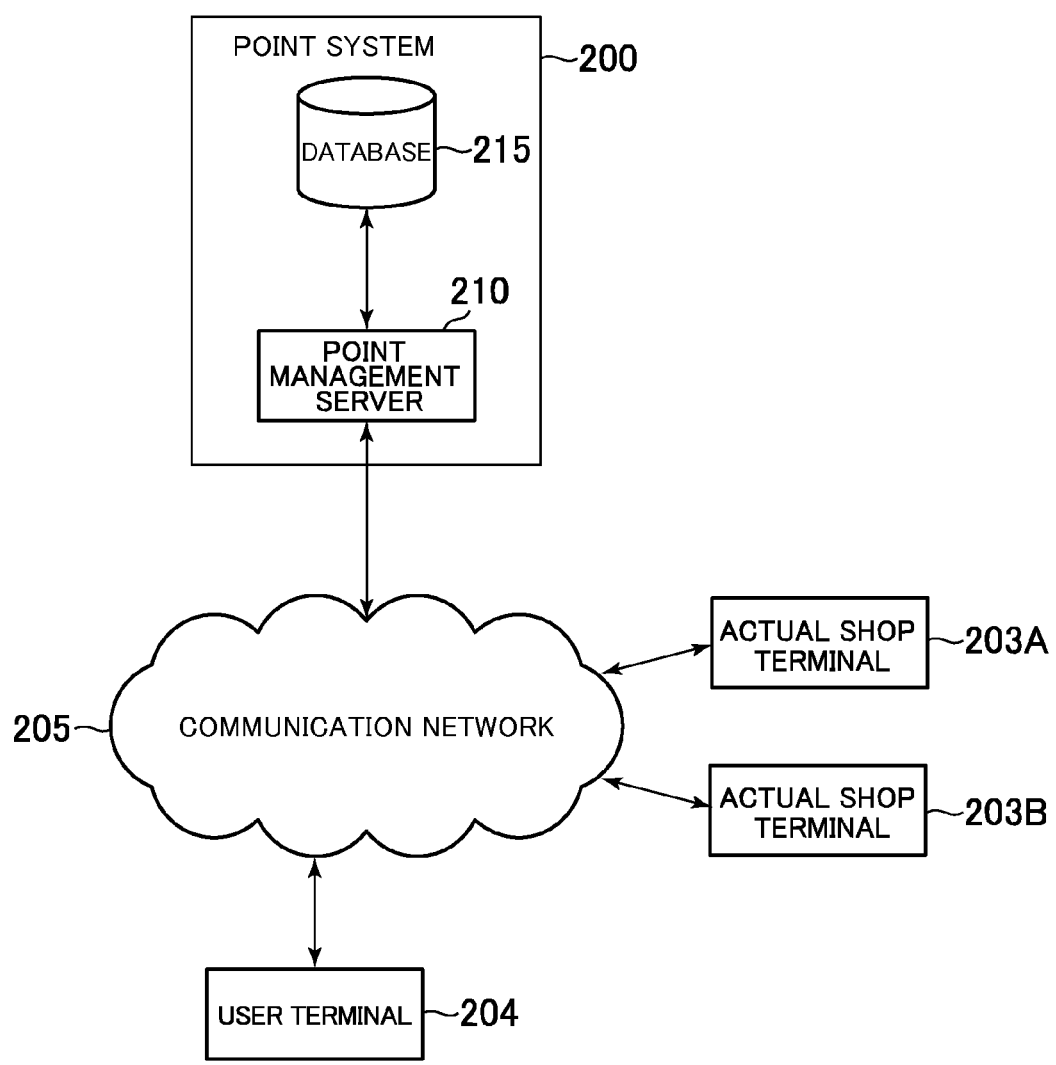
FIG. 40 shows one example of an overall structure of a point system according to another embodiment of the present invention.

A point system according to a sixth embodiment will be described. FIG. 40 shows one example of a structure of a point system according to the sixth embodiment.

A point system 200 according to the sixth embodiment is a system for providing a point service to a user of an actual shop that actually exists (for example, a shop or the like where a product is actually exhibited and sold). Here again, an actual shop that actually exists is referred to as the "actual shop".

A membership card (for example, a point card) is issued to a user at the actual shop, and points are imparted to a user who presents the membership card in buying a product or using a service. The user can receive various privileges based on the points. For example, by presenting the membership card in buying a product or using a service, the user can appropriate the points for all or a part of the payment. For example, the points can be appropriated for all or a part of the payment based on 1 point=1 JPY. Such a point service is provided by the point system 200.

As shown in FIG. 40, the point system 200 includes a point management server 210 (a point management device) and a database 215. A hardware structure of the point management server 210 is similar to that of the point management server 10 in the first embodiment (see FIG. 2). That is, the point management server 210 as well includes a control unit, a storage unit, an optical disk drive unit, and a communication unit. Further, the control unit executes processing according to a program stored in the storage unit.

A program and data are supplied to the storage unit of the point management server 210 via an optical disk. That is, a program and data recorded in the optical disk is read by the optical disk drive unit and stored in the storage unit of the point management server 210.

Note that the point management server 210 may include a structural element for reading a program or data stored in an information storage medium (for example, a memory card) other than the optical disk. Then, a program and data may be stored in the storage unit of the point management server 210 via the information storage medium other than the optical disk. Alternatively, a program and data may be stored in the storage unit of the point management server 210 via the communication network 205.

The point management server 210 can access the database 215. The database 215 may be created in the point management server 210 or in a server other than the point management server 210. For example, information necessary to provide the point service to a user of an actual shop is stored in the database 215. Information stored in the database 215 is to be described later.

Actual shop terminals 203A, 203B are each an information processing device installed in an actual shop. For example, each actual shop terminal 203A, 203B is a POS register. Each of the actual shop terminals 203A, 203B has a function for reading a bar code or a magnetic code, and can read bar codes or magnetic codes of various cards or a bar code displayed on the display unit of a portable terminal. Further, data communication is possible via a communication network 205 between each of the actual shop terminals 203A, 203B and the point management server 210. In the following, the actual shop terminals 203A, 203B may be collectively referred to as an "actual shop terminal 203".

A user terminal 204 is an information processing device used by a user. For example, the user terminal 204 is a personal computer, a portable phone (including a smart phone), a portable information terminal, or the like. The user terminal 204 includes a control unit, a storage unit, a communication unit, an operation unit, a communication unit, and a display unit.

Below, a procedure to be performed by a user to use the point service provided by the point system 200 will be described.

Initially, the user performs a procedure for user registration to use the point service. For example, the user accesses from the user terminal 204 a web page for user registration provided by the point management server 210. Then, the user inputs information on the user themselves (for example, a name, a password, an address, a mail address, and the like) on the user registration screen displayed on the display unit of the user terminal 204. The information inputted on the user registration screen is sent to the point management server 210 and stored in the database 215 (see FIG. 42 to be described later).

Thereafter, the user has a membership card (a point card) issued for use at an actual shop. For example, the managing company of the point system 200 has distributed membership cards in advance to the actual shop, and the membership card distributed by the managing company of the point system 200 is issued to the user at the actual shop. A point card similar to the point card 40 shown in FIG. 5, for example, is issued to the user. Alternatively, the user may perform the above mentioned procedure for registration after the membership card is issued.

Note that a program for causing a portable terminal (for example, a portable phone) to function as the membership card may be installed into the portable terminal, and the portable terminal may be used as the membership card instead of the point card 40 (see FIG. 39).

The user can earn points by presenting the membership card at the actual shop in buying a product or using a service. At this point of time, the membership card is in a temporary state. That is, the membership card is in a state where it is possible to earn points but not to use points.

After performing the procedure for user registration and the procedure for issuing a membership card, the user performs a procedure for linking their user ID in the point service and the membership card issued at the actual shop. For example, the user accesses from the user terminal 204 a web page provided by the point management server 210. The web page is similar to that in the first embodiment, for example (see FIGS. 6 to 8).

On the log-in screen 50 (see FIG. 6), the user inputs the user ID and password used in the point service. When the registration button 76 on the registration screen 70 (see FIG. 8) is clicked, link between the user ID in the point service and the membership card issued at the actual shop is registered in the database 215 (see FIG. 46 to be described later). Note that the user who has a plurality of membership cards issued at a plurality of actual shops can have the plurality of membership cards linked to their own user ID.

The point system 200 according to the sixth embodiment has an unauthorized use preventing function for preventing an unauthorized use of a membership card. In the following, this unauthorized use preventing function will be described.

Figures 41, 42, 43:
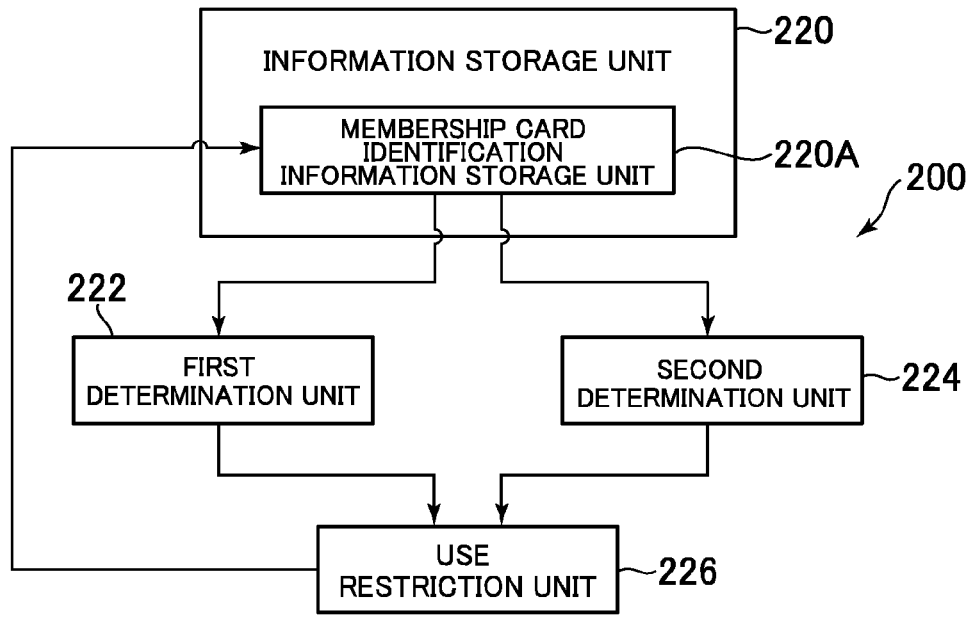
FIG. 41 is a function block diagram of the point system.
FIG. 42 shows one example of the user table.
FIG. 43 shows one example of an actual shop table.

FIG. 41 is a function block diagram showing function blocks relevant to the above described unauthorized use preventing function among those which are implemented in the point system 200. As shown in FIG. 41, the point system 200 includes an information storage unit 220, a first determination unit 222, a second determination unit 224, and a use restriction unit 226. For example, the information storage unit 220 is implemented using the database 215, and the other function blocks are implemented by the control unit of the point management server 210.

The information storage unit 220 stores various information items necessary to provide the point service. For example, information on a user using the point service, information on an actual shop which is a member of the point service (a location or the like), information on a history of use of a membership card (an actual shop where the membership card is used and a time and date at which the membership card is used). Note that the information storage unit 220 includes a membership card identification information storage unit 220A. The membership card identification information storage unit 220A stores one or more membership card identification information items in association with user identification information. The "user identification information" is information for identifying a user. The "membership card identification information" is information for identifying a membership card for imparting and/or using points at the actual shop. Specifically, data such as is shown in FIGS. 42 to 46, for example, is stored in the information storage unit 220.

FIG. 42 shows one example of a user table. The user table shows a list of users who use the point service provided by the point system 200. For example, the user table includes "user ID", "password", "user name", "address", and "mail address" fields.

In the "user ID" field, identification information for uniquely identifying a user is registered. A user ID may be designated by the user or automatically determined by the point system 200. In the "password" field, a password designated by the user is registered. In the "user name", "address", and "mail address" fields, the name, address, and mail address of the user are respectively registered.

FIG. 43 shows one example of an actual shop table. The actual shop table shows a list of actual shops that are members of the point service provided by the point system 200. For example, the actual shop table includes "actual shop ID", "shop name", "postcode", "address", and "telephone number" fields. In the "actual shop ID" field, identification information for uniquely identifying an actual shop is registered. The name, postcode, address, and telephone number of the actual shop are registered in the "shop name", "postcode", "address", and "telephone number" fields, respectively.

FIG. 44 shows one example of a membership card table. The membership card table shows a list of membership cards for use at respective actual shops. For example, the membership card table includes a list of point cards 40 distributed to the respective actual shops by the managing company of the point system 200. In addition, the membership card table also includes a list of portable terminals that are used as a membership card instead of the point card 40.

For example, the membership card table includes "membership card ID", "card ID", "security code", "magnetic code", "actual shop ID", "type", "validity flag", "link flag", and "point balance" fields.

In the "membership card ID" field, identification information for uniquely identifying a membership card is registered. In the "card ID" and "security code" fields, the card ID 46 and the security code 48 printed on the point card 40 are registered, respectively. In the "magnetic code" field, a magnetic code recorded on the magnetic stripe 42 of the point card 40 is registered. In the "actual shop ID" field, the actual shop ID of the actual shop that has issued the membership card is registered.

The "type" field indicates the type of the membership card. For example, either the value "0" or "1" is registered in the "type" field. The value "0" indicates that the membership card is the point card 40; the value "1" indicates that the membership card is the portable terminal (see FIG. 39 to be described later).

The "validity flag" field indicates whether or not the membership card is valid. For example, either the value "0" or "1" is registered in the "validity flag" field. The value "0" indicates that the membership card is not valid; the value "1" indicates that the membership card is valid. Note that, as described above, when the membership card is not valid, use of points is restricted. That is, when the membership card is not valid, it is possible to earn points but not to use the points.

The "link flag" field indicates whether or not the procedure for linking a user ID in the point service and the membership card issued at the actual shop is completed. For example, either the value "0" or "1" is registered in the "link flag" field. The value "0" indicates that the membership card is not linked to the user ID; the value "1" indicates that the membership card is linked to the user ID. Note that before completion of the above described procedure, the value "0" is set in the "validity flag" and "link flag" fields.

In the "point balance" field, the remaining of the points imparted to the membership card is registered.

FIG. 45 shows one example of a point history table. The point history table shown in FIG. 45 shows a history of imparting or using points at the respective actual shops. That is, the point history table is data indicating a history of using the membership card (a location where the membership card is used and a time and date at which the membership card is used). For example, the point history table includes "ID", "time and date", "membership card ID", "actual shop ID", "earned point", and "used point" fields.

In the "ID" field, identification information for uniquely identifying each record in the point history table is registered. In the "time and date" field, a time and date when points has been earned or used (that is, a time and date when the membership card is used) is registered. In the "user ID" field, the user ID of a user who has earned or used the points is registered. In the "membership card ID" field, the membership card ID of a membership card presented by a user when buying a product or using a service is registered. In the "actual shop ID" field, the actual shop ID of an actual shop where the user has bought or used a product or a service (that is, an actual shop where the user has used the membership card) is registered.

In the "earned point" field, the amount of points earned by the user by buying a product or the like is registered. The "earned point" field includes "basic" and "bonus" fields. For example, the amount of points obtained by multiplying a predetermined percentage to a purchase price are imparted to the user having bought a product as basic points. In addition, during a special period, such as a period of a campaign or the like conducted at a shop, bonus points may be imparted to the user in addition to the above mentioned basic points. The "basic" field indicates the basic points earned by the user; the "bonus" field indicates the bonus points earned by the user. In the "used point" field, the amount of points used by the user in buying a product or the like is registered.

FIG. 46 shows one example of a link table. A link table shows a link between a user ID used in the point service and a membership card used at an actual shop.

In the case where a first membership card ID and a second membership card ID are linked to a single user ID, the first determination unit 222 determines whether or not the location of a first actual shop at which the first membership card identified by the first membership card ID has been used is far away from the location of a second actual shop at which the second membership card identified by the second membership card ID has been used. That is, the first determination unit 222 determines, based on a predetermined determination criterion, whether or not the difference in location between the first actual shop and the second actual shop is large.

Note here that the above mentioned "determination criterion" refers to a determination criterion for determining whether or not the difference in location between the first actual shop and the second actual shop is large.

For example, the above mentioned "determination criterion" may be "whether or not the distance between the location of the first actual shop and that of the second actual shop is longer than a reference distance". In this case, it is necessary to have information necessary to calculate the distance between actual shops registered in the actual shop table. For example, it is necessary to have the latitude and the longitude of the location of each actual shop registered in the actual shop table.

Further, for example, the above mentioned "determination criterion" may be "whether or not the administrative district of the location of the first actual shop differs from that of the second actual shop". For example, an "administrative district" corresponds to "prefecture" in Japan, "state or county" in the U.S., "province or region" in China, "special city, metropolitan city, or province" in Korea. Note that an "administrative district" may refer to an administrative district subordinate to the administrative district mentioned above as examples. For example, the "administrative district" may correspond to "city, town, or village" in Japan.

Further, for example, the above mentioned "determination criterion" may be "whether or not a predetermined part (or the whole) of the postcode of the location of the first actual shop differs from a predetermined part (or the whole) of the postcode of the location of the second actual shop". In the case of Japan, for example, a seven-digit number obtained by combining a three-digit number identifying a region with a four-digit number identifying a post office in charge of collection and delivery is used as the postcode. In the case where a number that is a combination of an n-digit number (n: an integer of one or greater) identifying a region and an m-digit number (m: an integer of one or greater) identifying additional information (a post office in charge of collection and delivery, or the like) is used as the postcode as described above, the above mentioned "determination criterion" may be "whether or not the first n-digit number of the postcode of the location of the first actual shop differ from the first n-digit number of the postcode of the location of the second actual shop". Alternatively, in the case where a number including only an n-digit number (n: one or more integer) identifying a region is used as the postcode, the above mentioned "determination criterion" may be "whether or not the postcode of the location of the first actual shop differs from the postcode of the location of the second actual shop".

Further, for example, in the case where a telephone number includes a number identifying a region, the above mentioned "determination criterion" may be "whether or not the regional number of the telephone number of the location of the first actual shop differs from the regional number of the telephone number of the location of the second actual shop". For example, as the telephone number of a fixed telephone in Japan includes an area code identifying an area, the above mentioned "determination criterion" may be "whether or not the area code of the telephone number of the location of the first actual shop differs from the area code of the telephone number of the location of the second actual shop".

Further, for example, a combination of administrative districts (in the case of Japan, for example, prefecture, city, town, village, or the like) that are considered far away from each other may be defined in advance. Then, the above mentioned "determination criterion" may be "whether or not the combination of the administrative district of the location of the first actual shop and the administrative district of the location of the second actual shop coincide with any of the above described predetermined combinations".

Further, for example, a combination of postcodes (or telephone numbers or the like) that are considered far away from each other may be defined in advance. Then, the above mentioned "determination criterion" may be "whether or not the combination of the postcode (or a telephone number or the like) of the location of the first actual shop and the postcode (or telephone numbers or the like) of the location of the second actual shop coincides with any of the above described predetermined combinations".

In the case where a first membership card ID and a second membership card ID are linked to a single user ID, the second determination unit 224 determines whether or not the time and date (a first time and date) at which the first membership card identified by the first membership card ID is used at the first actual shop is close to the time and date (a second time and date) at which the second membership card identified by the second membership card ID is used at the second actual shop. That is, the second determination unit 224 determines, based on a predetermined determination criterion, whether or not the difference between the first time and date and the second time and date is small.

Note here that the above mentioned "determination criterion" is a determination criterion for determining whether or not the difference between the first time and date and the second time and date is small.

For example, the above mentioned "determination criterion" may be "whether or not the difference in time between the first time and date and the second time and date is smaller than a reference period of time". Alternatively, the above mentioned "determination criterion" may be "whether or not the first time and date and the second time and date belong to the same day".

The use restriction unit 226 restricts use of at least one of the first and second membership cards based on the result of determination by the first determination unit 222 and the result of determination by the second determination unit 224.

For example, when the difference in the location between the first actual shop and the second actual shop is large, and the difference between the first time and date and the second time and date is small, the use restriction unit 226 restricts use of at least one of the first and second membership cards. That is, in the case where the location of the first actual shop is far away from the location of the second actual shop and the first time and date is close to the second time and date, the use restriction unit 226 restricts use of at least one of the first and second membership cards.

Note that "to restrict use of a membership card" means, for example, to prohibit use of points. Alternatively, "to restrict use of a membership card" means to prohibit both use and earning of points. For example, the use restriction unit 226 changes the validity flag of the membership card to "0" to thereby restrict use of the membership card.

A case in which the location of the first actual shop is far away from the location of the second actual shop and the first time and date is close to the second time and date corresponds to a case in which the first and second membership cards linked to a single user ID have been used by two or more persons. In this case, it is highly likely that at least one of the users has used the membership card for fraud. Regarding this point, according to the point system 200 according to the sixth embodiment, as the first and second membership cards are invalidated in such a case, it is possible to prevent unauthorized use of the first and second membership cards.

Note that according to the point system. 200 according to the sixth embodiment, in the case where membership cards for use by two or more users are linked to a single user ID, use of these membership cards is restricted. Therefore, according to the point system 200 according to the sixth embodiment, in the case where, for example, there is a rule defining that a membership card for use by only a single user can be linked to a single user ID, it is possible to prevent use of a membership card that violates such a rule.

Figure 47:
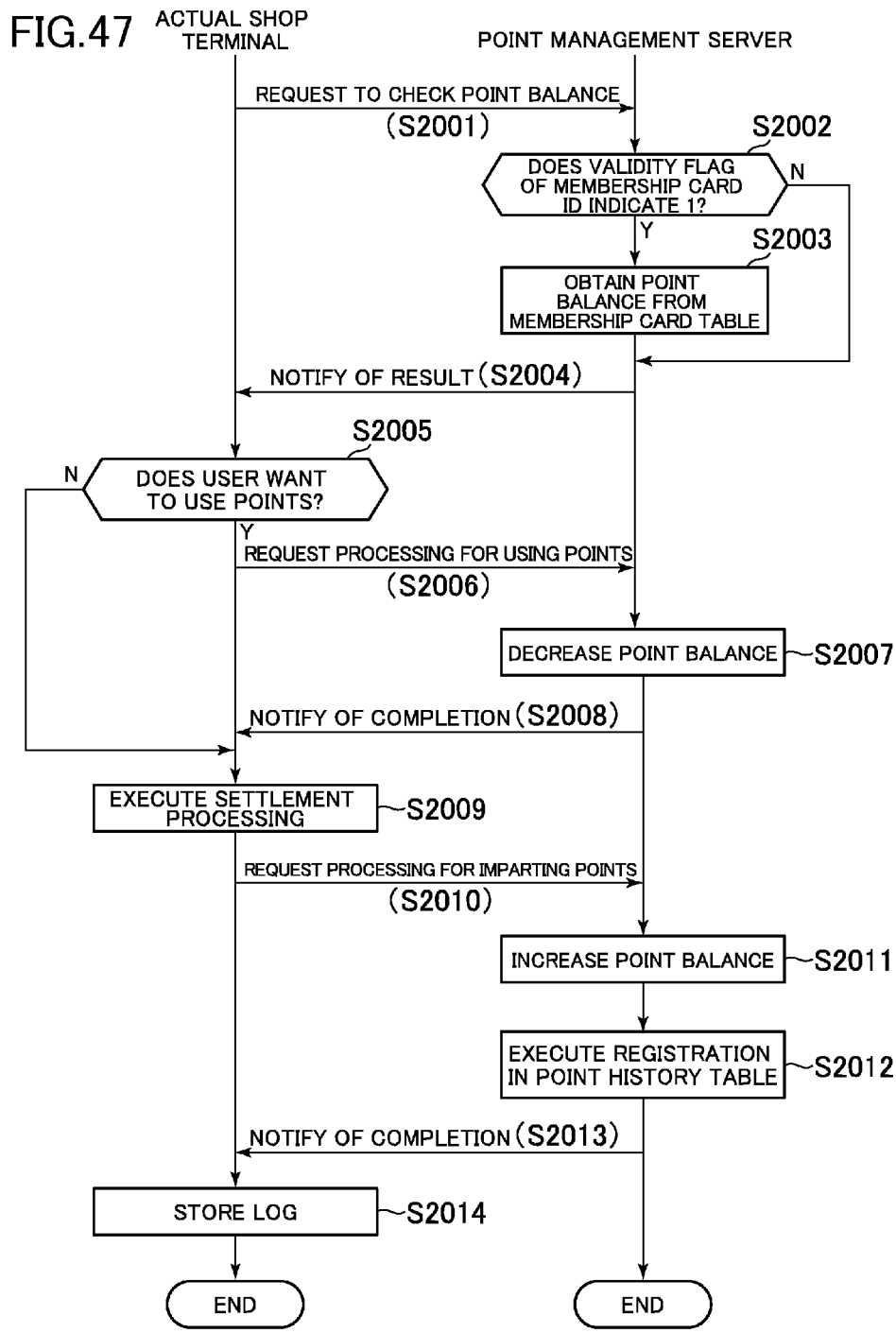
FIG. 47 shows another example of processing executed in the point system.

In the following, processing that is executed in the point system 200 according to the sixth embodiment will be described. FIG. 47 shows one example of processing that is executed when a user presents the point card 40 in buying a product or using a service at an actual shop. That is, FIG. 47 shows one example of processing that is executed when the membership card presented by the user is read at the actual shop terminal 203.

As shown in FIG. 47, initially, the control unit of the actual shop terminal 203 requests the point management server 210 to check the point balance (S2001). In this case, the membership card ID of the membership card presented by the user is sent to the point management server 210.

When the above described request is received in the point management server 210, the control unit of the point management server 210 refers to the membership card table to determine whether or not the membership card presented by the user is valid by determining whether or not the validity flag of the membership card ID received from the actual shop terminal 203 indicates "1" (S2002).

A case in which the validity flag of the membership card ID does not indicate "1" refers to a case in which the membership card presented by the user is not valid and it is thus not possible to use points. In this case, the control unit notifies the actual shop terminal 203 that it is not possible to use points (S2004).

Meanwhile, when the validity flag of the membership card ID indicates "1", the control unit obtains from the membership card table a point balance stored in association with the membership card ID received from the actual shop terminal 203 (S2003). For example, in a case in which the membership card ID received from the actual shop terminal 203 at step S2001 is "00001", the control unit refers to the membership card table to obtain the point balance of the membership card ID "00001". Then, the control unit notifies the actual shop terminal 203 of the point balance obtained (S2004).

When the notice from the point management server 210 is received at the actual shop terminal 203, the content of the notice is displayed on the display unit of the actual shop terminal 203. Based on the content displayed, a sales staff of the actual shop asks the user if they want to use points. When the user wants to use points, the sales staff performs an operation for instructing to use points. Note that the operation of instructing to use points cannot be performed when it is not possible to use points.

The control unit of the actual shop terminal 203 determines whether or not the user wants to use points (S2005).

When the user wants to use points, the control unit requests the point management server 210 to execute processing for using points (S2006). In this case, information indicating the amount of payment due to the user is sent to the point management server 210 together with the membership card ID of the membership card presented by the user.

When the above described request is received in the point management server 210, the control unit accesses the membership card table to decrease the point balance stored in association with the membership card ID received from the actual shop terminal 203 (S2007).

Assume here a case in which payment due to the user is 500 JPY and the membership card ID received from the actual shop terminal 203 at step S2006 is "00001". In this case, the control unit refers to the membership card table to obtain the point balance of the membership card ID "00001". In the example shown in FIG. 44, the point balance of the membership card ID "00001" is 200 points. In this case, as the point balance of the membership card ID "00001" is equal to or less than the payment due to the user (500 JPY), all of the points of the membership card ID "00001" are used. That is, the point balance of the membership card ID "00001" is updated to 0. Further, in this case, the remaining of the payment due to the user becomes 300 JPY.

After execution of step S2007, the control unit notifies the actual shop terminal 203 of completion of the processing for using points (S2008). In this case, the amount of points used and the remaining of the payment due to the user are notified to the actual shop terminal 203. Alternatively, either one of the amount of points used and the remaining of the payment due to the user may be informed to the actual shop terminal 203.

When the above described notice is received at the actual shop terminal 203, the control unit of the actual shop terminal 203 displays the content of the notice on the display unit. The sales staff of the actual shop checks the content, and then performs an operation for settlement processing. The control unit of the actual shop terminal 203 executes the settlement processing according to the operation by the sales staff (S2009).

When the settlement processing is completed, the control unit of the actual shop terminal 203 requests the point management server 210 to execute processing for imparting points (S2010). In this case, information indicating the amount of points to be imparted to the user and the amount of points used by the user is sent to the point management server 210 together with the membership card ID. Note that the amount of points to be imparted to a user who has used points may be determined based on the original amount of payment or the amount actually paid by the user.

When the above described request is received in the point management server 210, the control unit accesses the membership card table to increase the point balance of the membership card ID received from the actual shop terminal 203 (S2011). That is, the point balance of the membership card ID received from the actual shop terminal 203 is increased by the amount of points to be imparted to the user. Further, the control unit executes registration in the point history table (S2012). Thereafter, the control unit notifies the actual shop terminal 203 of completion of the processing for imparting points (S2013). Then, when this notice is received at the actual shop terminal 203, the actual shop terminal 203 stores the content of the notice as a log in the storage unit (S2014).

Although it is described in the above that the processing for imparting points is executed immediately after completion of the settlement processing, the processing for imparting points may be collectively executed during, for example, a time band with a fewer processing load (for example, at midnight).

Figure 48:
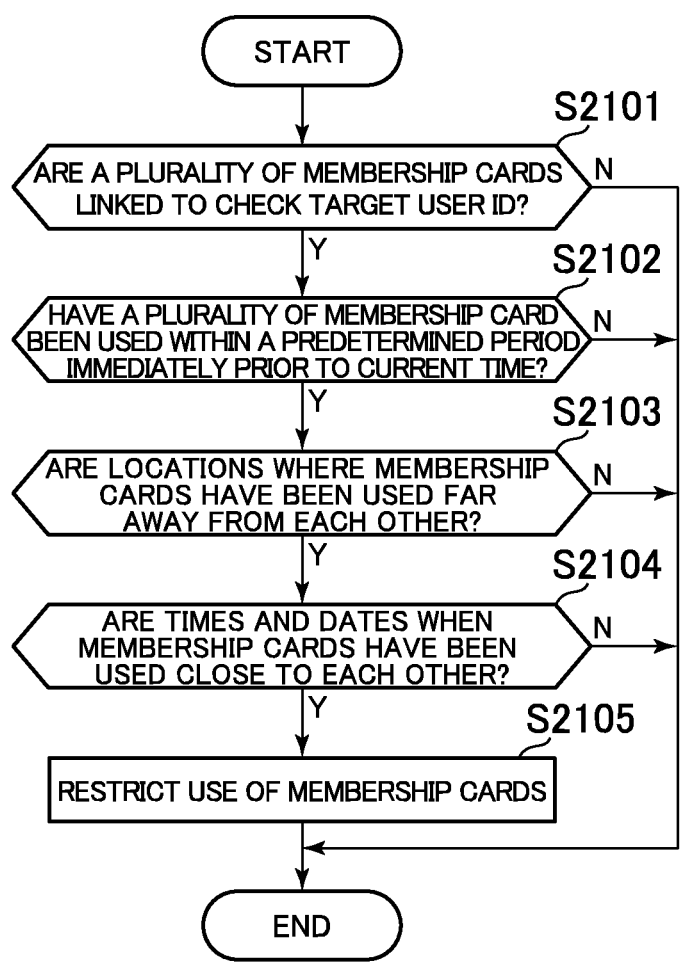
FIG. 48 shows another example of processing executed in the point system.

FIG. 48 shows one example of processing that is executed by the point management server 210 at a predetermined time. The processing shown in FIG. 48 is processing for determining whether or not a plurality of membership cards linked to a single user ID are used for fraud by two or more persons. The control unit of the point management server 210 executes the processing shown in FIG. 48 according to a program, thereby functioning as the first determination unit 222, the second determination unit 224, and the use restriction unit 226.

The processing shown in FIG. 48 is executed for every user ID. For example, the processing shown in FIG. 48 is executed with respect to the user ID "U0001" as a check target, and thereafter, the processing shown in FIG. 48 is executed with respect to the user ID "U0002" as the check target. That is, as described above, the processing shown in FIG. 48 is executed while sequentially selecting the respective user IDs as the check target.

Further, the processing shown in FIG. 48 is executed for every predetermined period of time (for example, one hour). Alternatively, the processing shown in FIG. 48 is executed at a predetermined time (for example, at 0 o'clock) every day.

As shown in FIG. 48, initially, the control unit determines whether or not a plurality of membership cards are linked to a user ID that is a check target (S2101). That is, the control unit refers to the link table to determine whether or not a plurality of membership card IDs are linked to the check target user ID. When a plurality of membership cards are not linked to the check target user ID, the control unit ends this processing.

Meanwhile, when a plurality of membership cards are linked to the check target user ID, the control unit refers to the point history table to determine whether or not a plurality of membership cards among those plurality of membership cards have been used during a predetermined period (for example, 24 hours) immediately prior to the current time (S2102). When the plurality of membership cards have not been used within the period, the control unit ends this processing.

Meanwhile, when the plurality of membership cards have been used within the period, the control unit determines whether or not the places where the plurality of respective membership cards have been used are far away from each other (S2103). That is, the control unit refers to the actual shop table to determine, based on the above described determination criterion, whether or not the locations of the actual shops where the plurality of respective membership cards have been used are far away from each other. When it is determined that the places where the plurality of respective membership cards have been used are not far away from each other, the control unit ends this processing.

Meanwhile, when it is determined that the places where the plurality of respective membership cards have been used are far away from each other, the control unit determines whether or not the times and dates when the plurality of respective membership cards have been used are close to each other (S2104). For example, the control unit refers to the point history table to determine whether or not the difference between the times and dates when the plurality of respective membership cards have been used is within a threshold (for example, three hours). Then, the above described difference is within the threshold, the control unit determines that the times and dates when the plurality of respective membership cards have been used are close to each other. When it is determined that the times and dates when the plurality of respective membership cards have been used are not close to each other, the control unit ends this processing.

Meanwhile, when it is determined that the times and dates when the plurality of respective membership cards are used are close to each other, the control unit restricts use of the plurality of membership cards (S2105). That is, the control unit accesses the membership card table to set the validity flags of the plurality of membership cards to "0". Then, the control unit ends this processing.

Note that step S2104 in FIG. 48 may be omitted. In the manner described above, use of a plurality of membership cards may be restricted when the plurality of membership cards linked to a single user ID are used in respective places far away from each other within a predetermined period of time (for example, 24 hours).

At step S2102 in FIG. 48, the control unit may determine whether or not a plurality of membership cards are used today. Alternatively, the control unit may determine whether or not a plurality of membership cards are used yesterday. In the latter case, when a plurality of membership cards linked to a single user ID are used in respective places far away from each other at close points of time, use of the plurality of membership cards will be restricted from the next day.

According to the above described point system. 200 according to the sixth embodiment, it is possible to prevent use of first and second membership cards linked to a single user ID by a plurality of persons.

Further, according to the point system 200 according to the sixth embodiment, for example, when there is a rule defining that a membership card used by only a single user can be linked to a single user ID, it is possible to prevent use of a membership card that violates the rule.

Note that the point system 200 may include a plurality of point management servers 210. The processing shown in FIG. 47 and the processing shown in FIG. 48 may be executed by different point management servers 210, respectively.

Further, in the point service provided by the point system 200, a user may be able to use points imparted at an actual shop at another actual shop.

Note that the present invention is not limited to the above described first to sixth embodiments.

[1] For example, points earned by a user at an actual shop may be stored in a storage medium included in a membership card. For example, points earned by the user at the actual shop may be stored in an IC chip included in the point card 40 or a storage unit included in the portable terminal.

[2] In the electronic commerce (the virtual shopping mall), not only a product such as clothes, food, or the like, but also data such as, for example, electronic book data, music data, video data, or the like, may be sold as a product. In an electronic commerce (the virtual shopping mall) or the actual shop, not only sale of a product but also sale or provision of a service may be implemented.

The invention claimed is:

1. A point system for providing a point service to a user, comprising:
  a database;
  an electronic commerce server; and
  a point management server,
  wherein the database is configured to:
  store points in association with user identification information for identifying the user in an electronic commerce provided by the electronic commerce server, the points being imparted to the user; and store points in association with membership card identification information for identifying a membership card presented at an actual shop, the points being imparted to the membership card identification information;

the point management server is configured to:

receive a link request for linking the user identification information and the membership card identification information;

register link information in the database in a case where the link request is, received, the link information indicating a link between the user identification information and the membership card identification information;

determine, in a case where first membership card identification information and second membership card identification information are linked to single user identification information, whether or not a difference in location between a first shop and a second shop is large based on a predetermined determination criterion, the first shop being a shop where a first membership card identified by the first membership card identification information is used, the second shop being a shop where a second membership card identified by the second membership card identification information is used;

determine, in the case where the first membership card identification information and the second membership card identification information are linked to the single user identification information, whether or not a difference between a time and date when the first membership card is used at the first shop and a time and date where the second membership card is used at the second shop is small based on a predetermined determination criterion; and restrict use of at least one of the first membership card and the second membership card based on a result of determination of whether or not the difference in location between the first shop and the second shop is large and a result of determination whether or not the difference between the time and date when the first membership card is used at the first shop and the time and date when the second membership card is used at the second shop is small.

2. The point system according to claim 1, wherein
the point management server is configured to:
receive a point use request with a designation of the user identification information from the electronic commerce server; and
permit using, in the electronic commerce, the points imparted to the membership card identification information linked to the user identification information, in a case where the user identification information and the membership card identification information are linked and the point use request with a designation of the user identification information is received.

3. The point system according to claim 1, wherein
the database is configured to store points, which are imparted to a first membership card identification information, in association with the first membership card identification information, and stores points, which are imparted to a second membership card identification information, in association with, the second membership card identification information, and
the point management server is configured to permit, in a case where the first membership card identification information and the second membership card identification information are linked to the user identification information and a point use request with a designation of the first membership card identification information is received, using the points imparted to the user identified by the user identification information linked to the first membership card identification information and the points imparted to the second membership card identification information linked to the user identification information.

4. The point system according to claim 1,
wherein the point management server is further configured to integrate points imparted to the membership card identification information into the points imparted to the user identified by the user identification information linked to the membership card identification information,
after the points imparted to the membership card identification information are integrated into the points imparted to the user identified by the user identification information, an impartment of points and a use of points are performed with respect to one of the user identification information and the membership card identification information.

5. The point system according to claim 4,
wherein the point management server is further configured to integrate the points imparted to the membership card identification information into the points imparted to the user identified by the user identification information, in a case where registration of the link information is executed.

6. The point system according to claim 1, wherein
it is possible to have a plurality of membership card identification information items linked to single user identification information, and
the point management server is further configured to restrict a number of membership card identification information items that are allowed to be linked to the single user identification information to a number equal to or less than a predetermined upper limit number.

7. The point system according to claim 1,
wherein the point management server is further configured to:
receive a use restriction request with a designation of the membership card identification information; and
restrict use of the membership card identified by, the membership card identification information in a case where the use restriction request with a designation of the membership card identification information is received.

8. The point system according to claim 1, wherein
the point management server is further configured to receive from the user a participation request for participating in a campaign conducted at the actual shop,
the database is further configured to store participation situation information in association with the user identification information, the participation situation information indicating whether or not the participation request is already received from the user identified by the user identification information; and
the point management server is further configured to increase or decrease points to be imparted in a case where the user buys or uses a product or a service at the actual shop while presenting the membership card based on the participation situation information stored in association with the user identification information linked to the membership card identification information of the membership card.

9. The point system according to claim 2, wherein
the database is configured to store points, which are imparted to a first membership card identification information, in association with the first membership card identification information, and store points, which are imparted to a second membership card identification information, in association with the second membership card identification information, and
the point management server is configured to permit, in a case where the first membership card identification information and the second membership card identification information are linked to the user identification information and a point use request with a designation of the first membership card identification information is received, using the points imparted to the user identified by the user identification information linked to the first membership card identification information and the points imparted to the second membership card identification information linked to the user identification information.

10. The point system according to claim 2, wherein the point management server is further configured to:
receive a use restriction request with designation of the membership card identification information; and
restrict use of the membership card identified by the membership card identification information in a case where the use restriction request with a designation of the membership card identification information is received.

11. The point system according to claim 3, wherein the point management server is further configured to:
receive a use restriction request with a designation of the membership card identification information; and
restrict use of the membership card identified by the membership card identification information in a case where the use restriction request with a designation of the membership card identification information is received.

12. The point system according to claim 4, wherein the point management server is further configured to:
receive a use restriction request with a designation of the membership card identification information; and
restrict use of the membership card identified by the membership card identification information in a case where the use restriction request with a designation of the membership card identification information is received.

13. The point system according to claim 5, wherein the point management server is further configured to:
receive a use restriction request with a designation of the membership card identification information; and
restrict use of the membership card identified by the membership card identification information in a case where the use restriction request with a designation of the membership card identification information is received.

14. The point system according to claim 6, wherein the point management server is further configured to:
receive a use restriction request with a designation of the membership card identification information; and
restrict use of the membership card identified by the membership card identification information in a case where the use restriction request with a designation of the membership card identification information is received.

15. The point system according to claim 1, wherein the point management sewer is further configured to:
receive a point use request with a designation of the membership card identification information from a terminal device of the actual shop; and
permit using, at the actual shop, the points imparted to the membership card identification information and the points imparted to the user identified by the user identification information linked to the membership card identification information, in a case where the user identification information and the membership card identification information are linked and the point use request with a designation of the membership card identification information is received,
wherein before the user identification information and the membership card identification information are linked, the use permission unit does not permit using, at the actual shop, the points imparted to the membership card identification information.

16. The point system according to claim 1, wherein
the user identification information to be associated with the membership card identification information is identification information to identify a user in the electronic commerce, and is identification information to which points have been added in accordance with a purchase or a use of a product or a service in the electronic commerce before the user identification information is associated with the membership card identification information.

17. The point system according to claim 1, wherein
in a case where a plurality of membership card identification information items are linked with user identification information, an impartment of points is carried out with respect to an individual membership card identification information item, and a use of points is carried out with respect to the plurality of identification information items in a predetermined order.

18. The point system according to claim 1, wherein
in a case where points are used, a subtraction of points is executed immediately, and
in a case where points are imparted, an addition of points is collectively executed during a predetermined time band.

19. A method for controlling a point system for providing a point service to a user, the method comprising:
accessing a database that stores points imparted to the user in association with user identification information for identifying the user in an electronic commerce provided by an electronic commerce server, and;
that stores points imparted to the membership card identification information in association with membership card identification information for identifying a membership card presented at an actual shop;
receiving a link request for linking the user identification information and the membership card identification information;
registering link information in a link information storage unit in a case there the link request is received, the link information indicating a link between the user identification information and the membership card identification information;
determining, in a case where first membership card identification information and second membership card identification information are linked to single user identification information, whether or not a difference in location between a first shop and a second shop is large based on a predetermined determination criterion, the first shop being a shop where a first membership card identified by the first membership card identification information is used, the second shop being a shop where a second membership card identified by the second membership card identification information is used;

determining, in the case where the first membership card identification information and the second membership card identification information are linked to the single user identification information, whether or not a difference between a time and date when the first membership card is used at the first shop and a time and date where the second membership card is used at the second shop is small based on a predetermined determination criterion; and restricting use of at least one of the first membership card and the second membership card based on a result of determination of whether or not the difference in location between the first shop and the second shop is large and a result of determination of whether or not the difference between the time and date when the first membership card is used at the first shop and the time and date when the second membership card is used at the second shop is small.

20. A non-transitory computer readable information storage medium storing a program for causing a computer to function as a point management device for providing a point service to a user, the program for causing the computer to:

access a database that stores points imparted to the user in association with user identification information for identifying the user in an electronic commerce provided by an electronic commerce server; and that stores points imparted to the membership card identification information in association with membership card identification information for identifying a membership card presented at an actual shop;

receive a link request for linking the user identification information and the membership card identification information;

resister link information in the database in a case where the link request is received, the link information indicating a link between the user identification information and the membership card identification information;

determine, in a case where first membership card identification information and second membership card identification information are linked to single user identification information, whether or not a difference in location between a first shop and a second shop is large based on a predetermined determination criterion, the first shop being a shop where a first membership card identified by the first membership card identification information is used, the second shop being a shop where a second membership card identified by the second membership card identification information is used;

determine, in the case where the first membership card identification information and the second membership card identification information are linked to the single user identification information, whether or not a difference between a time and date when the first membership card is used at the first shop and a time and date where the second membership card is used at the second shop is small based on a predetermined determination criterion; and restrict use of at least one of the first membership card and the second membership card based on a result of determination of whether or not the difference in location between the first shop and the second shop is large and a result of determination of whether or not the difference between the time and date when the first membership card is used at the first shop and the time and date when the second membership card is used at the second shop is small.

* * * * *